United States Patent
Andrews et al.

(10) Patent No.: US 6,243,960 B1
(45) Date of Patent: Jun. 12, 2001

(54) TRACER, CLAMP AND OBJECT ENGAGER FOR HOLDING AND TRACING A LENS MOUNT OF AN EYEGLASS FRAME, A LENS, AND/OR A LENS PATTERN, TO RELIABLY DETECT A SHAPE THEREOF EVEN WHEN THE SHAPE INCLUDES HIGH WRAP

(75) Inventors: Daniel E. Andrews, Charlottesville; Guenter G. Fietzke, Forest; David L. Kountz, Lynchburg; Andrew W. Doan, Madison Heights, all of VA (US); Kimber W. Rarick, Muskogee, OK (US); Don S. Wills, Broken Arrow, OK (US); Martin A. Moon; Ryan J. Davis, both of Tulsa, OK (US); John T. Rathbone, Broken Arrow, OK (US)

(73) Assignee: National Optronics, Incorporated, Charlottesville, VA (US)

( * ) Notice: Subject to any disclaimer, the term of this patent is extended or adjusted under 35 U.S.C. 154(b) by 0 days.

(21) Appl. No.: 09/270,115

(22) Filed: Mar. 16, 1999

(51) Int. Cl.[7] .................................................. G01B 1/00
(52) U.S. Cl. .............................................................. 33/507
(58) Field of Search ................................ 33/28, 200, 507, 33/559

(56) References Cited

U.S. PATENT DOCUMENTS

| | | |
|---|---|---|
| 659,778 | 10/1900 | Weaver . |
| 912,518 | 2/1909 | Wilhelm . |
| 1,002,124 | 8/1911 | Borensen . |
| 1,184,496 | 5/1916 | Stenvall . |
| 1,721,161 | 7/1929 | Maynard . |
| 2,209,605 | 7/1940 | Maynard . |
| 2,441,472 | 5/1948 | D'Avacourt ............................ 51/216 |
| 2,573,668 | 10/1951 | Long ..................................... 51/277 |
| 2,748,541 | 6/1956 | Connell ................................. 51/101 |
| 3,410,031 | 11/1968 | Soong ................................... 51/237 |

(List continued on next page.)

*Primary Examiner*—G. Bradley Bennett
(74) *Attorney, Agent, or Firm*—Liniak, Berenato, Longacre & White, LLC

(57) ABSTRACT

A tracer is provided for tracing a lens mount of an eyeglass frame, a lens or a lens pattern. The tracer comprises an object engager and an actuator. The object engager is adapted to engage the lens mount, the lens or the lens pattern. The actuator is adapted to move the object engager into contact with and then along the lens mount, the lens or the lens pattern in such a way that during movement therealong, the object engager remains against the object being traced even when the shape thereof includes high wrap. Preferably, the tracer has a shift mechanism adapted to shift the object engager from alignment with the lens mount to alignment with a second lens mount of the eyeglass frame. The actuator preferably is further adapted to trace the second lens mount in substantially the same way as the first. The actuator further includes a rotator and a pivot mechanism. The rotator is adapted to rotate the object engager along the object being traced. The pivot mechanism facilitates movement of the object engager toward or away from the axis as the object engager is actuated along the object. The object engager can extend or retract along the pivot mechanism. A clamp for the tracer and an object engager also are provided.

43 Claims, 12 Drawing Sheets

U.S. PATENT DOCUMENTS

| | | | |
|---|---|---|---|
| 3,631,637 | 1/1972 | Tagnon | 51/237 |
| 3,771,265 | 11/1973 | Bright | 51/101 |
| 4,051,601 | 10/1977 | Godot | 33/174 |
| 4,217,736 | 8/1980 | Akaba et al. | 51/284 |
| 4,561,213 | 12/1985 | Tusinski et al. | 51/105 |
| 4,562,671 | 1/1986 | Bouillon et al. | 51/216 |
| 4,653,234 | 3/1987 | Lombard | 51/216 |
| 4,653,881 | 3/1987 | Joncour | 351/204 |
| 4,724,617 | 2/1988 | Logan et al. | 33/28 |
| 4,912,880 | 4/1990 | Haddock et al. | 51/101 |
| 4,941,291 | 7/1990 | Brueck | 51/105 |
| 4,945,684 | 8/1990 | Wada et al. | 51/165.77 |
| 4,951,421 | 8/1990 | Brueck | 51/105 |
| 4,991,305 | 2/1991 | Saigo et al. | 33/507 |
| 4,993,195 | 2/1991 | Gray | 51/281 |
| 5,053,971 | 10/1991 | Wood et al. | 364/474.06 |
| 5,097,600 | 3/1992 | Brule et al. | 33/28 |
| 5,121,548 | 6/1992 | Daboudet et al. | 33/507 |
| 5,121,550 | 6/1992 | Wood et al. | 33/551 |
| 5,137,263 | 8/1992 | Savoie et al. | 269/266 |
| 5,138,770 * | 8/1992 | Matsuyama | 33/200 |
| 5,139,373 | 8/1992 | Logan et al. | 409/80 |
| 5,152,067 * | 10/1992 | Kurachi et al. | 33/507 |
| 5,158,422 | 10/1992 | Wagner | 409/84 |
| 5,195,246 | 3/1993 | Chansavoir | 33/28 |
| 5,210,695 | 5/1993 | Wood | 364/474.06 |
| 5,228,242 | 7/1993 | Matsuyama | 51/165.74 |
| 5,283,980 | 2/1994 | Lohrenz | 51/165.72 |
| 5,307,150 | 4/1994 | Lecerf et al. | 356/376 |
| 5,341,604 | 8/1994 | Wood | 51/165.71 |
| 5,431,595 | 7/1995 | Underwood | 451/237 |
| 5,501,017 | 3/1996 | Suzuki | 33/200 |
| 5,515,612 | 5/1996 | Igarashi et al. | 33/200 |
| 5,554,067 | 9/1996 | Lecerf et al. | 457/384 |
| 5,567,198 | 10/1996 | Cook | 451/384 |
| 5,594,992 | 1/1997 | Suzuki et al. | 33/200 |
| 5,611,252 | 3/1997 | Hattori et al. | 82/165 |
| 5,615,486 | 4/1997 | Igarashi et al. | 33/200 |
| 5,649,856 | 7/1997 | Cook | 451/460 |
| 5,695,393 | 12/1997 | Granziera | 451/390 |
| 5,746,436 | 5/1998 | Kulan et al. | 279/4.04 |
| 5,754,272 * | 5/1998 | Dimalanta | 33/507 |
| 5,763,075 | 6/1998 | Benjamin et al. | 428/349 |
| 5,775,973 | 7/1998 | Watanabe | 451/5 |
| 5,785,580 | 7/1998 | Cook | 451/42 |
| 5,802,731 | 9/1998 | Guillermin et al. | 33/502 |
| 5,845,408 | 12/1998 | Chansavoir et al. | 33/200 |

* cited by examiner

TRACER, CLAMP AND OBJECT ENGAGER FOR HOLDING AND TRACING A LENS MOUNT OF AN EYEGLASS FRAME, A LENS, AND/OR A LENS PATTERN, TO RELIABLY DETECT A SHAPE THEREOF EVEN WHEN THE SHAPE INCLUDES HIGH WRAP

BACKGROUND OF THE INVENTION

The present invention relates to a tracer, clamp, and object engager for holding and tracing a lens mount of an eyeglass frame, a lens, and/or a lens pattern, to reliably detect the shape thereof even when the shape includes high wrap. The term "high wrap" as used here in encompasses shapes that have a curvature greater than 6 diopters. Typically, though not necessarily, the high wrap is provided so that the eyeglass frame more closely follows the contour of the wearer's face.

In the eyeglass industry, it desirable to provide lenses having different shapes and sizes to accommodate different sizes and shapes of eyeglass frames. Generally, eyeglass lenses start out as blanks having certain optical properties designed to correct one or more defects in a patient's vision. It is unlikely, however, that every member of the population having such vision defect(s) will agree on one size or shape of eyeglass frame. For this reason, lens blanks are routinely subjected to edge processing in an effort to adapt them to a selected size and shape of eyeglass frames.

This custom edge processing can be achieved using any one of several conventional techniques. According to one such technique, each eyeglass frame manufacturers provide lens patterns that fit within the respective lens mounts of those manufacturers' eyeglass frames. When a patient selects a particular style and size of frame, a lens blank which has been formed to correct that particular patient's vision defect is placed in an edging apparatus along with the pattern or patterns provided by the frame manufacturer. The edging apparatus then traces the pattern and removes material from the periphery of the lens blank in accordance with the pattern. This process is analogous to conventional key duplication techniques. U.S. Pat. No. 5,158,422 to Wagner, assigned to the assignee hereof, discloses an example of such an edging apparatus. Alternatively, the edger may be numerically controlled in order to eliminate the need for patterns.

The conventional pattern-based technique, however, has certain drawbacks associated with it. These drawbacks include, for example, the number of patterns which must be provided, the storage space required for such patterns, and the difficulties which arise when the patterns become misplaced or when they are misaligned during tracing. Typically, one or more patterns must be provided for each different shape and/or size of eyeglass frame. The amount of storage space required for such patterns increases as the choices in eyeglass frame sizes and shapes expand. Therefore, while the conventional technique is generally effective, there remains a need for a more convenient arrangement.

In order to provide a more convenient arrangement, efforts were made to eliminate or reduce the need for patterns by providing a tracing apparatus capable of tracing the lens mounts of eyeglass frames. The results of such tracings then were used to provide edging information for use in edging a lens blank. U.S. Pat. No. 4,724,617 discloses an example of such a tracing apparatus. While such tracing of the frames is generally effective when the lens mounts in the eyeglass frames are substantially planar, problems are frequently encountered when the frames have a high wrap.

In particular, the stylus that performs the tracing in conventional tracers is generally biased in a radially outward direction to engage a groove in the lens opening or mount of the eyeglass frame. This radially outward biasing remains effective so long as the groove in the lens mount extends in the same radially outward direction. Eyeglass frames with high wrap, however, tend to have grooves in the high wrap region which extend obliquely (and which can even approach the perpendicular) with respect to the radially outward direction. There is consequently a tendency for the stylus of the tracing apparatus to "fall out" of the groove as it enters the high wrap region.

This incompatibility between conventional tracers and frames having a high wrap is exacerbated by the effects of gravity when the frames are held in the typical substantially horizontal, downward-facing orientation. In that orientation, the high wrap generally causes the sides of the frames to extend upwardly. As the stylus enters the high wrap region and the groove in the frame gradually transitions to a more upwardly extending orientation, gravity acts to pull the stylus down and out from the groove. The stylus therefore tends to "fall out" of the groove, rendering the tracing completely inaccurate. Tracers which bold the frames in a horizontal, downward-facing orientation therefore tend to be limited to use on substantially planar eyeglass frame configurations.

Eyeglass frames, however, are available in many different shapes and sizes. Recently, eyeglass frames with high wrap shapes have become even more popular than before. There is consequently a need in the art for a versatile eyeglass frame tracer capable of tracing the lens mounts even if the eyeglass frame has a high wrap shape.

There also is a need in the art for a tracer which can trace not only lens mounts with high wrap, but also lens patterns and actual lenses with high wrap when such lens patterns and actual lenses are more readily available to the operator than the eyeglass frames.

SUMMARY OF THE INVENTION

It is a primary object of the present invention to satisfy at least one of the foregoing needs in the art and to alleviate at least one of the foregoing problems by providing a tracer adapted to trace lens mounts of eyeglass frames even when such eyeglass frames have high wrap.

Another object of the present invention is to provide a clamp assembly for eyeglass frames, which clamp assembly has clamp arms which move symmetrically with respect to a plane of symmetry located between the clamp arms.

To achieve these and other objects, the present invention provides a tracer for tracing a lens mount of an eyeglass frame, a lens, or a lens pattern. The tracer comprises an object engager and an actuator. The object engager is adapted to engage the lens mount, the lens, or the lens pattern. The actuator is adapted to move the object engager into contact with and then along the lens mount, the lens, or the lens pattern in such a way that during movement along the lens mount, the lens, or the lens pattern, the object engager remains against the lens mount, the lens, or the lens pattern even when a shape thereof includes high wrap.

Preferably, the tracer further comprises a shift mechanism adapted to shift the object engager from alignment with the right lens mount to alignment with the left mount of the eyeglass frame. The actuator preferably is further adapted to move the object engager into contact with and then along the second lens mount in such a way that during movement along the second lens mount, the object engager remains against the second lens mount even when a shape thereof includes high wrap.

Preferably, the actuator includes a rotator and a pivot mechanism. The rotator is adapted to rotate the object engager along the lens mount or along an edge of the lens or the lens pattern. The pivot mechanism is adapted to pivot the object engager away from the axis of rotation of the rotator, so that the object engager engages the bevel groove of the lens mount or the edge of the lens or lens pattern. The pivot mechanism also is adapted to facilitate movement of the object engager toward or away from the axis as the object engager is actuated along the lens mount or the edge of the lens or the lens pattern.

The object engager preferably is extendable and retractable with respect to the pivot mechanism. In addition, the actuator may further include an extension mechanism adapted to extend or retract the object engager with respect to the pivot mechanism.

The present invention also provides a clamp assembly for holding eyeglass frames. The clamp comprises opposed clamp arms that are linked to one another so that movement of one of the clamp arms in a first direction causes a corresponding movement of the other of the clamp arms in an opposite direction.

The present invention also provides an object engager. The object engager comprises a first surface oriented for contact with a lens mount of an eyeglass frame, a second surface oriented for contact with a beveled lens edge, and a third surface oriented for contact with a lens pattern. The first surface has a stylus projecting therefrom, whereas the second surface has a groove adapted to receive the beveled lens edge.

The above and other objects and advantages will become more readily apparent when reference is made to the following description taken in conjunction with the accompanying drawings.

DESCRIPTION OF PREFERRED EMBODIMENTS

Figure 1:
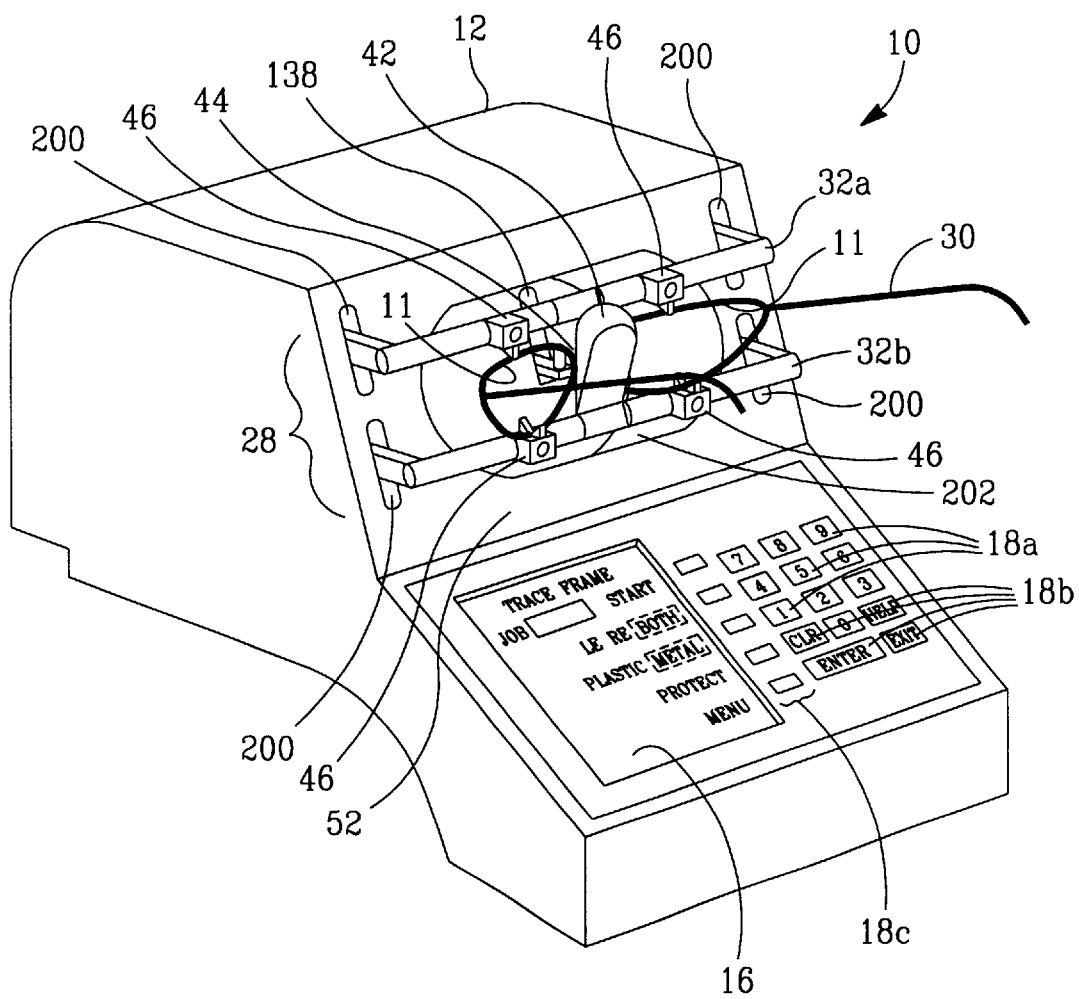
FIG. 1 is a perspective view of an assembled tracer according to a preferred embodiment of the present invention.

FIG. 1 illustrates a tracer 10 according to a preferred embodiment of the present invention. The tracer 10 is adapted to trace a lens mount or opening 11 of an eyeglass frame 30, a lens 61A (shown in FIG. 7), or a lens pattern 61B (also shown in FIG. 7). The tracer 10 preferably includes a top cover 12 with a visually pleasant appearance. The top cover 12 includes a control panel 14. The control panel 14 preferably is provided at an ergonomically suitable angle on the housing 12.

The control panel 14 includes a display device 16 and a keypad 18. Preferably, the display device 16 is an LCD display screen. The keypad 18 may include numeric (or alphanumeric) push-button keys 18A, at least one function key 18B, and a set of screen select keys 18C which are aligned with positions on the LCD display screen where user selectable information can be displayed. The present invention, of course, is not limited to the preferred arrangement shown in FIG. 1. The display device 16, for example, could be implemented using a touch-sensitive screen, in which case some of the keys 18A–18C in the exemplary keypad 18 can be eliminated in favor of "virtual" keys on the touch-sensitive screen. Still other alternative implementations of the control panel 14 can be used in accordance with the present invention.

The top cover 12 preferably encases most of the movable components of the tracer 10. This serves to protect users of the tracer 10 from potential injury that might otherwise result from exposure to moving parts. The top cover 12 also keeps loose objects from falling into the movable components and jamming the movable components.

Figure 2:
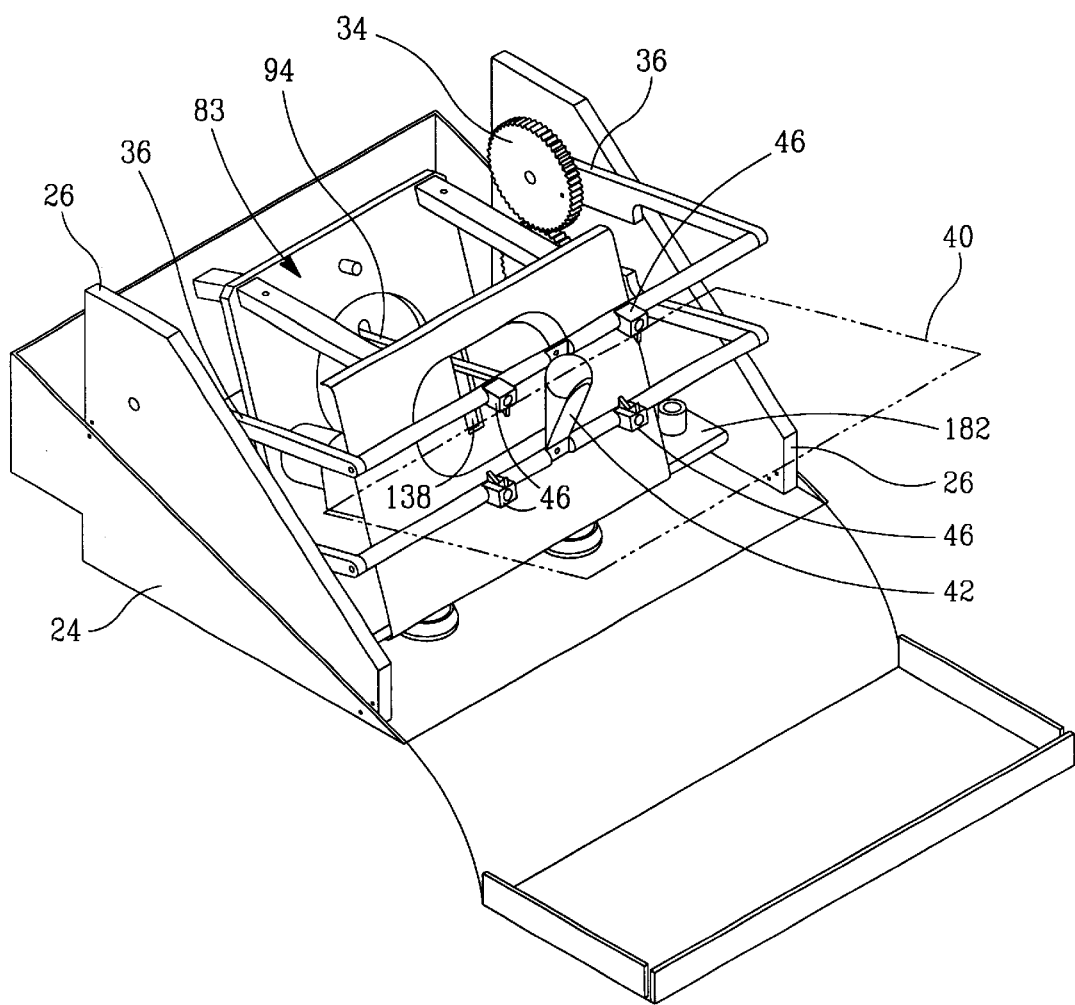
FIG. 2 is a perspective view of the tracer illustrated in FIG. 1 with its top cover removed.

FIG. 2 shows the tracer 10 with the top cover 12 removed. The top cover 12, when present, rests on a housing base 24. Extending vertically from the housing base 24 are two lateral walls 26. The lateral walls 26 support the movable components of the tracer 10. The movable components include, among other things, a clamp assembly 28 for holding any one of a plurality of different eyeglass frames 30 (e.g., as shown in FIG. 1).

Figure 3:
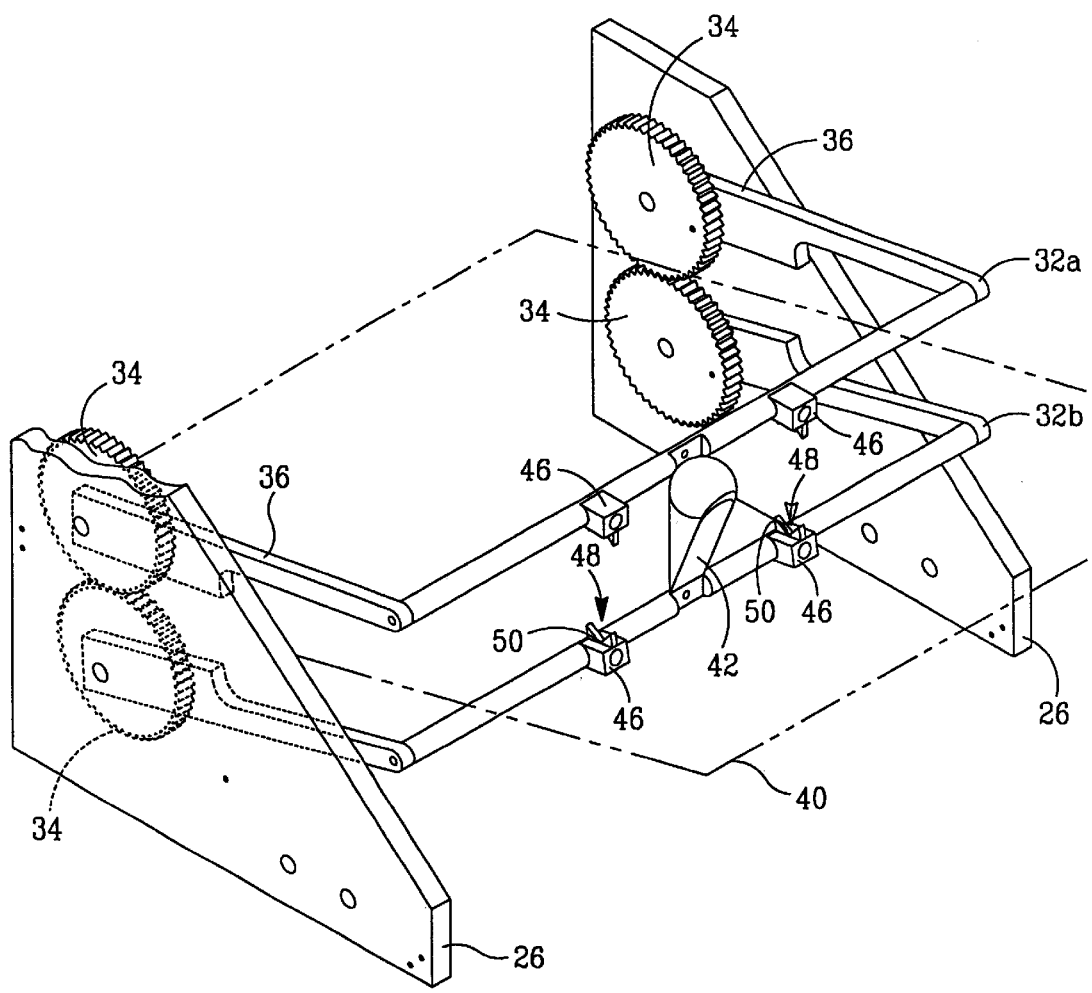
FIG. 3 is a perspective view of a clamp according to a preferred embodiment of the present invention.

As illustrated in FIG. 3, a preferred embodiment of the clamp assembly 28 has opposed clamp arms 32A,32B. The clamp arms 32A,32B are linked to one another, so that movement of one of the clamp arms 32A in a first direction (e.g., up) causes a corresponding movement of the other clamp arm 32B in an opposite direction (e.g., down).

Each clamp arm 32A,32B is pivotally connected to at least one (and preferably both) of the lateral walls 26. A gear 34 preferably is connected to each clamp arm 32A,32B. According the preferred embodiment, two such gears 34 are provided for each clamp arm 32A,32B. The gears 34 are located at both lateral ends 36 of the clamp arms 32A,32B and are connected thereto so that the gears 34 rotate whenever their respective clamp arms 32A,32B pivot with respect to the lateral walls 26. The gears 34 at each lateral wall 26 are intermeshed so that pivoting of one of the clamp arms 32A,32B in the first direction causes the other clamp arm 32B,32A to pivot in the opposite direction. The clamp arms 32A,32B therefore remain substantially equidistant from a plane of symmetry 40 (shown in FIGS. 2 and 3) located between the clamp arms 32A,32B. While we prefer the use of gears 34 as part of the clamp assembly, belts, friction rollers, and the like could also be used.

Preferably, the clamp arms 32A,32B are pivotally biased toward one another. This biasing can be provided using a spring mechanism or any other suitable means for biasing elements toward one another. Since the movement of each clamp arm 32A,32B is linked to movement of the other clamp arm 32B,32A by the gears 34, the biasing also can be provided by making the top clamp arm 32A heavier than the bottom clamp arm 32B. Gravity therefore would urge the top clamp arm 32A down with more force than the bottom clamp arm 32B. The clamp assembly 28 therefore would be biased toward closure. The amount of biasing advantageously can be modified by adjusting the weight of the clamp arms 32A and/or 32B.

Preferably, at least one of the clamp arms 32A,32B includes a frame centering device 42, as best shown in FIG. 2. The frame centering device 42 in the preferred embodiment is located on the bottom clamp arm 32B and is adapted to engage and retain a nose portion 44 of the eyeglass frame 30 when the eyeglass frame 30 is suitably positioned in the clamp assembly 28. The frame centering device 42 preferably is spring-loaded to urge the frame centering device 42 into the nose portion 44 of the frame 30.

As illustrated in FIGS. 1–3, each of the clamp arms 32A,32B preferably includes at least one eyeglass frame support 46. In the illustrated embodiment, each clamp arm 32A,32B has two such frame supports 46. Each eyeglass frame support 46 has a notch 48 for accommodating eyeglass frames 30. The notch 48 preferably has a V-shaped cross-section. The V-shaped cross-section of the notch 48 advantageously accommodates frames of different thicknesses and, despite such differences, tends to keep the frames 30 from moving within the notch 48. In particular, the V-shaped cross-section cooperates with the aforementioned biasing of the clamp arms 32A,32B, to effectively center the frames at the apex 50 of the notch 48. The exemplary combination of the frame supports 46 and the frame centering device 42 serves to locate the lens openings of the frames 30 laterally (side-to-side) with respect to the tracer 10 and at a predetermined distance from a front surface 52 of the housing 12.

According to a preferred embodiment of the eyeglass frame supports 46, the supports 46 located on the top clamp arm 32A are attached to each other by a rocker arm which is pivoted at the center of the bar. This feature allows the two upper supports 46 to float relative to each other, thereby accommodating frames that have eye openings that vary in size by a small amount. The eyeglass frame supports 46, according to the preferred embodiment, may be coated with a soft compliant material to enhance clamping robustness.

Figure 4:
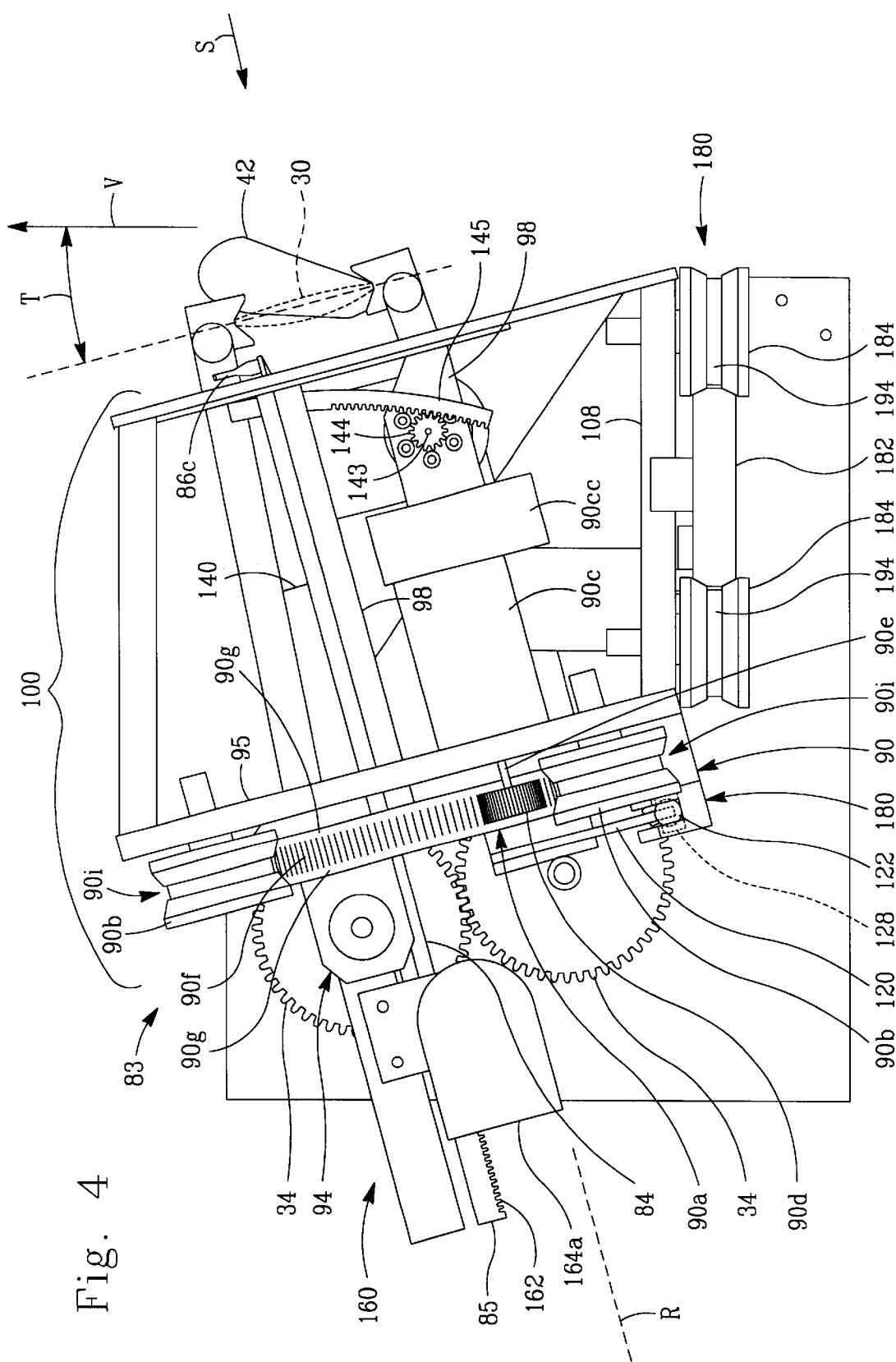
FIG. 4 is a side elevational view of the tracer mechanism which is illustrated in FIGS. 1–2.

Preferably, as illustrated in FIG. 3, the clamp assembly 28 is ergonomically oriented to facilitate clamping and unclamping of eyeglass frames 30 by a human operator of the tracer 10. In particular, the exemplary embodiment of the clamp assembly 28 is oriented so that the frames 30 arc received and held by the clamp assembly 28 at an angle of about zero to 45 degrees from a vertical orientation. As illustrated in FIG. 4, the eyeglass frames 30 preferably are held by the clamp assembly 28 at an angle T of about 10 degrees from the vertical orientation V.

Since the clamp arms 32A,32B are linked so that movement of one clamp arm 32A or 32B in one direction causes the other arm 32B or 32A to move in the opposite direction, the angle T remains substantially constant regardless of how far apart the clamp arms 32A,32B are when they engage the eyeglass frame 30. There is consequently little, if any, change in the angle T in response to variations in the size of the frames 30.

The small amount of tilt provided by the angle T is ergonomically beneficial because it aligns the eye openings in the eyeglass frame 30 with the operator's typical line of sight S. This, in turn, facilitates viewing of the positioning of the eyeglass frames 30 with respect to the clamp arms 32A,32B. It also facilitates use of a more direct arm motion when aligning and presenting the frames 30 to the clamp arms 32A,32B.

Arrangements that hold the frame 30 in a more horizontal than vertical orientation, by contrast, make visualization of the alignment more difficult, because the user typically must bend over the tracer in order to look down into where the frames 30 are held. Horizontal arrangements also tend to require more complicated (i.e., less direct) user arm motions when aligning and presenting the frames 30 to the clamping mechanism. The vertical or near-vertical orientation provided by the illustrated embodiment thus achieves significant ergonomic benefits over the more horizontal orientations provided by other devices.

Figure 5:
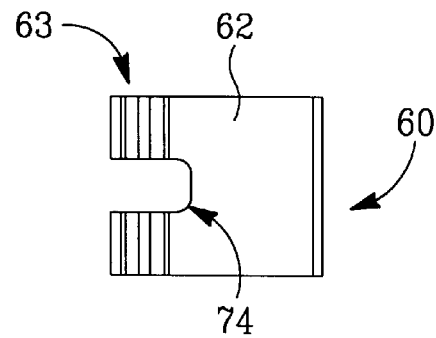
FIGS. 5–7 are top, front, and side views, respectively, of a holder according to a preferred embodiment of the present invention.
Figure 6:
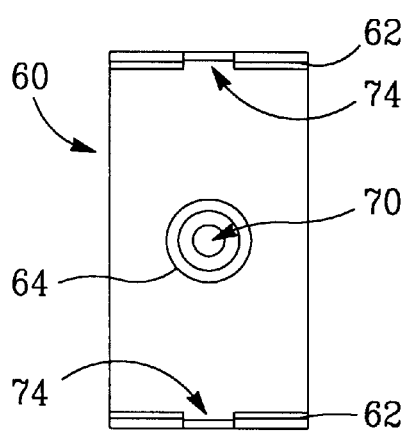
Figure 7:
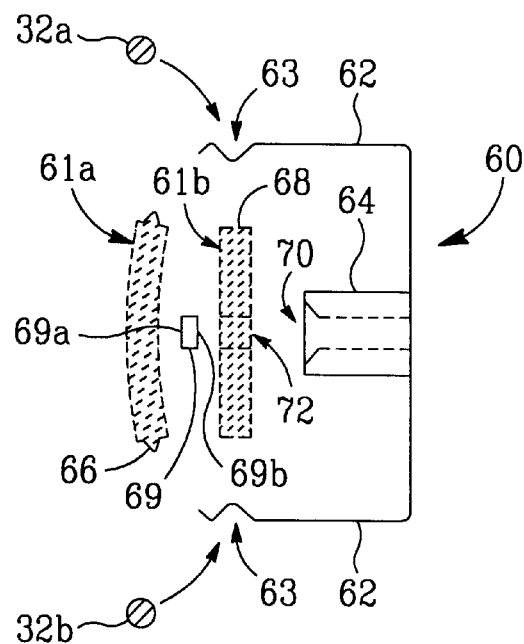

Inasmuch as certain situations may make tracing of a lens pattern or an actual lens more practical or convenient than tracing of the frame 30 itself, the present invention also provides a holder 60 for the lens 61A or lens pattern 61B. A preferred embodiment of the holder 60 is illustrated in FIGS. 5–7. While both the lens 61A and lens pattern 61B are shown in the drawings, it is understood that only one of them will be held by the holder 60 during the tracing process.

The holder 60 includes legs 62 adapted to removably engage respective ones of the clamp arms 32A,32B. The legs 62 preferably have recessed ends 63 which are shaped to accommodated the clamp arms 32A,32B. Alternatively, a snap-fitting or some other way of removably engaging the legs 62 to the clamp arms 32A,32B can be used.

The holder 60 further includes a support 64 for the lens 61A and/or for the lens pattern 61B. The support 64 is disposed between the legs 62 of the holder 60, and is adapted to support the lens 61A or lens pattern 61B between the legs 62 without obstructing access to a beveled edge 66 of the lens 61A or to an edge 68 of the lens pattern 61B. The edges 66,68 therefore remain unobstructed to facilitate tracing of them.

The lens 61A may be adhesively secured to a fastener using a LEAP pad 69. LEAP pads 69 are known in the industry to have two adhesive sides 69A,69B. One side 69A is applied to the optical center of the lens 61A and the other side 69B is applied to the head of the fastener (e.g., a bolt, screw, and the like). The fastener then is threadedly received in a fastener tunnel 70 through the support 64. The lens 61A thereby can be fastened to the support 64.

The lens pattern 61B, by contrast, has a centrally disposed passageway 72. The passageway 72 is adapted to receive the same or a different fastener, which fastener then is threadedly received in the fastener tunnel 70. In this manner, the lens pattern 61B may be fastened to the support 64.

Preferably, at least one of the legs 62 has a recess 74 which accommodates one of the eyeglass frame supports 46 when the legs 62 are engaged with the clamp arms 32A,32B. Both legs 62 in the preferred embodiment have the recess 74. The preferred embodiment of the holder 60 therefore accommodates two of the eyeglass frame supports 46. Preferably, the recesses 74, eyeglass frame supports 46, and the support 64 of the holder are arranged so that engagement of the eyeglass frame supports 46 in the recesses 74 automatically aligns the support 64 in a predetermined tracing position. Any lens 61A or lens pattern 61B carried by the support 64 therefore can be automatically aligned for tracing by the mere act of placing the holder 60 between the clamping arms 32A,32B so that the frame supports 46 are accommodated in the recesses 74. This advantageously simplifies preparation of the tracer 10 for tracing of the lens 61A or lens pattern 61B.

Figure 8:
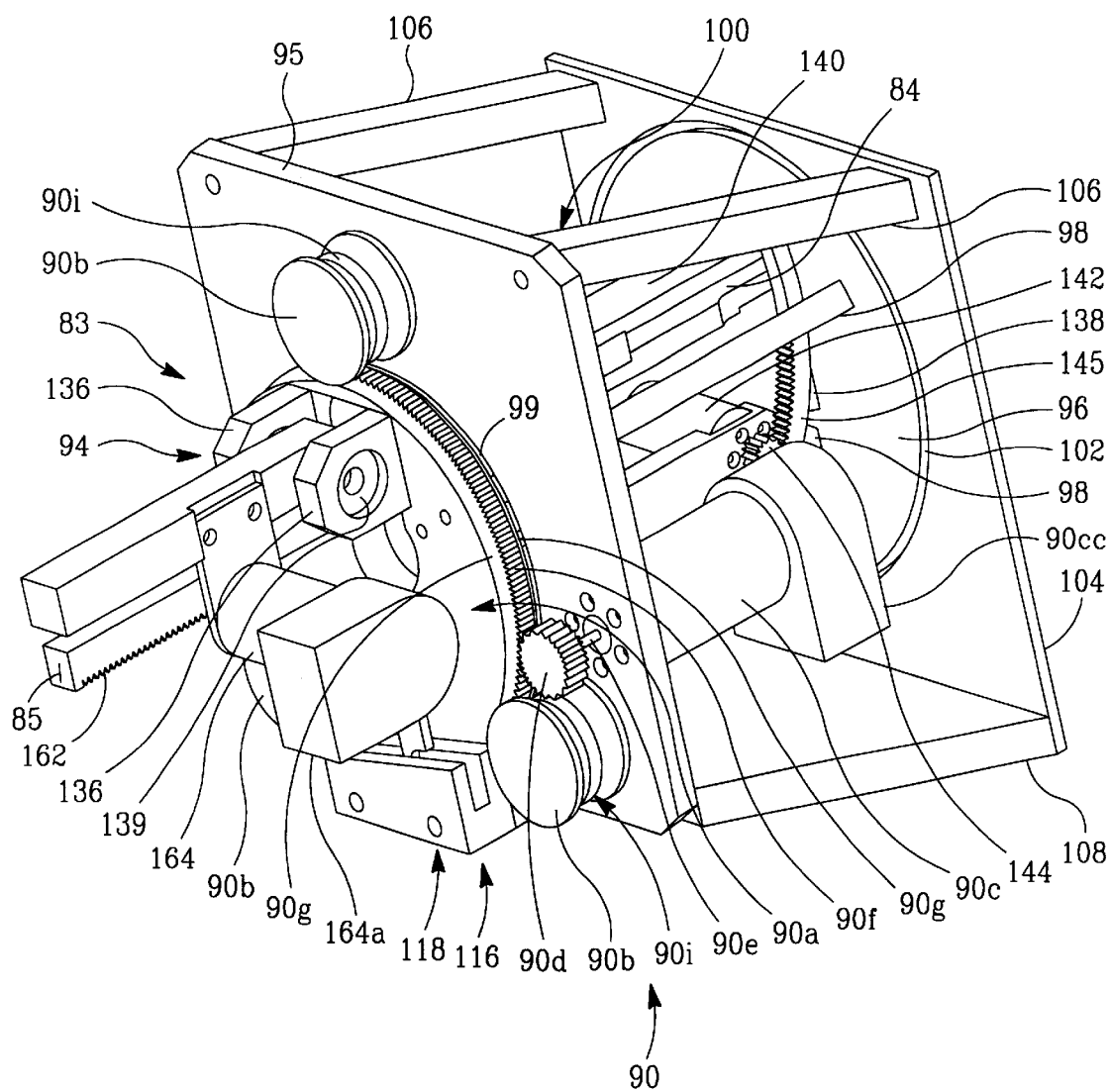
FIG. 8 is a rear perspective view of the tracer mechanism illustrated in FIG. 4.
Figure 9:
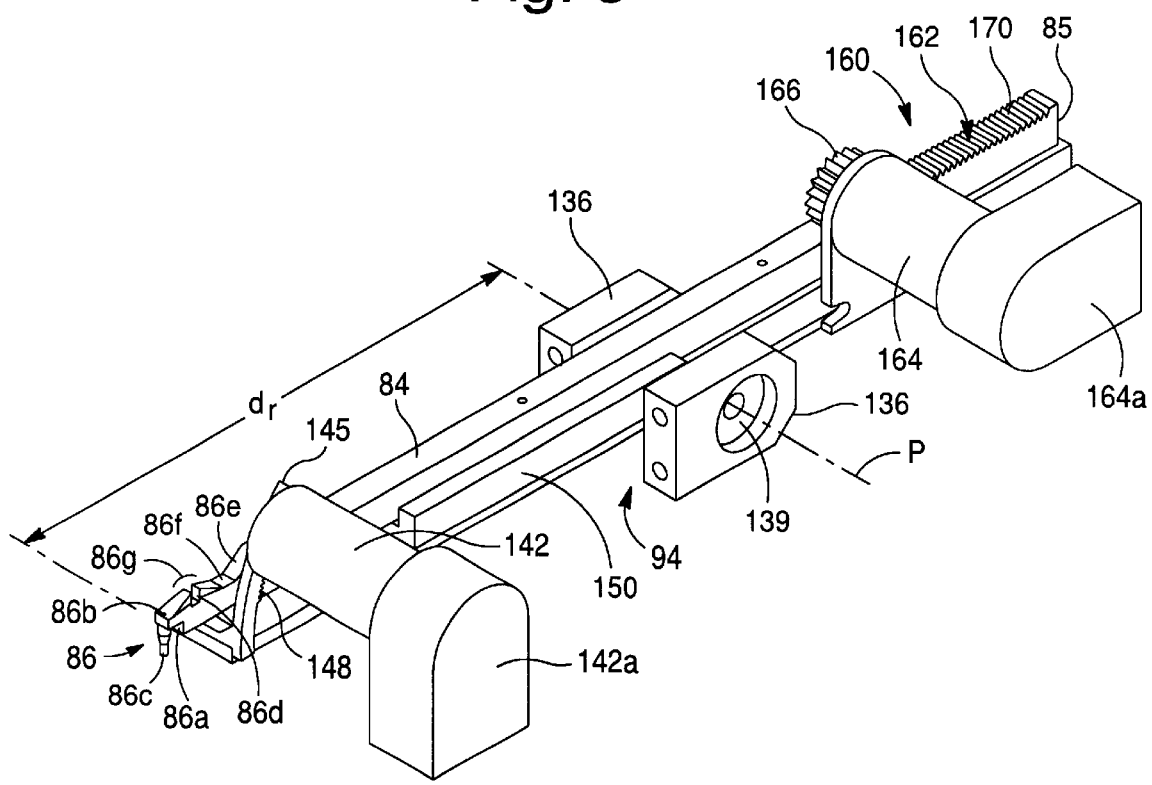
FIG. 9 is a perspective view of a pivot mechanism and an object engager according to a preferred embodiment of the present invention.
Figure 10:
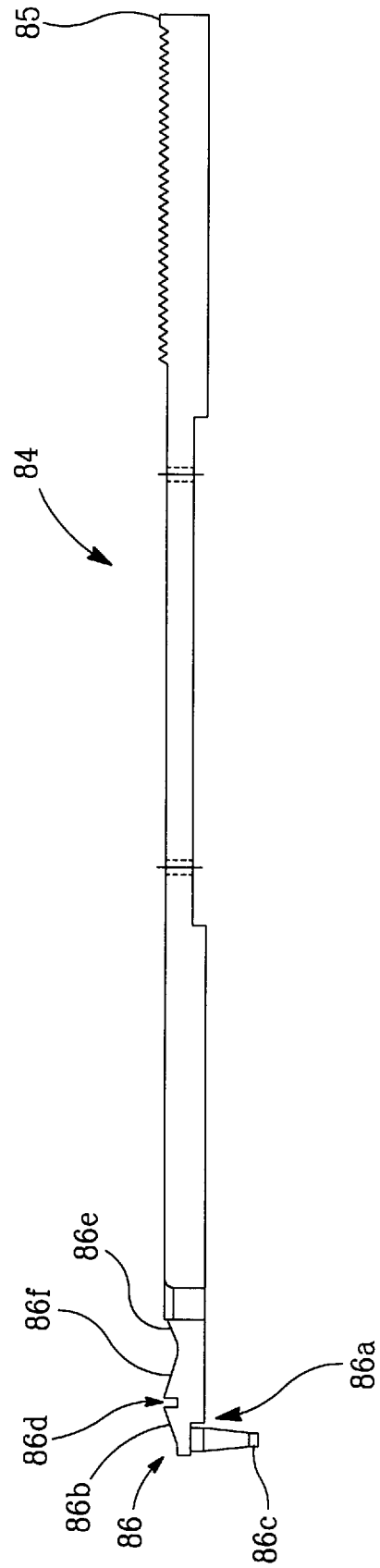
FIG. 10 is a side view of the object engager which is illustrated in FIG. 9.

With reference to FIGS. 4 and 8–10, the tracer 10 further includes an actuator 83 and an object engager 84 adapted to engage the lens mount 11 (shown in FIG. 1) of the eyeglass frame 30, the lens 61A (shown in FIG. 7), or the lens pattern 61B (shown in FIG. 7). Parts of the actuator 83 have been omitted from FIG. 9 to permit better visualization of the object engager 84 and its relationship to the remaining parts of the actuator 83. The object engager 84 alone is illustrated in FIG. 10.

As illustrated in FIGS. 9 and 10, the object engager 84 includes a proximal end 85 and a distal end 86. The distal end 86, preferably, has features that permit the object engager 84 to more positively engage the object being traced. Such features include, for example, a first surface 86A oriented for contact with the lens mount 11 and a second surface 86B oriented for contact with the beveled lens edge 66.

The first surface 86A preferably has a stylus 86C projecting therefrom. The stylus 86C extends into the bevel groove of the frame mount 11 while the frame mount 11 is being traced. Typically, the frame mount 11 will have a bevel groove extending completely around the frame mount's inner circumference. This groove generally is provided for the purpose of receiving the beveled edge 66 of the lens 61A when the lens 61A is mounted to the frame 30. During a tracing operation, however, there is no lens in the frame mount 11. The groove in the frame mount 11 therefore is free to receive the stylus 86C.

In order to facilitate tracing of the lens 61A, as opposed to the lens mount 11, the second surface 86B of the distal end 86 has a groove 86D which is adapted to receive the beveled edge 66 of the lens 61A. During the tracing operation, the aforementioned combination of the holder 60 and the clamp assembly 28 securely hold the lens 61A in place. Because the holder 60 is able to hold the lens 61A without obstructing access to the beveled edge 66, the beveled edge 66 may be kept in the groove 86D as the second surface 86B moves around the entire outer circumference of the lens 61A.

The second surface 86B also is oriented for contact with the lens pattern edge 68. Preferably, the second surface 86B further includes a shoulder 86E that engages the lens pattern edge 68. Like the lens 61A, the lens pattern 61B is held by the holder 60 without obstructing access to the pattern edge 68. The pattern edge 68 therefore can remain against the shoulder 86E as the second surface 86B moves around the entire outer circumference of the lens pattern 61B.

Preferably, as illustrated in FIGS. 9 and 10, the second surface 86B further includes a transition portion 86F located between the groove 86D and the shoulder 86E. The transition portion 86F provides a bearing surface along which the lens pattern edge 68 or the beveled lens edge 66 may slide as the groove 86D is brought into alignment with the beveled lens edge 66 or as the shoulder 86E is brought against lens pattern edge 68. Preferably, as illustrated in FIGS. 9 and 10, the transition portion 86F is saddle-shaped, the second surface 86B includes a bump 86G, and the groove 86D is located at the peak of the bump 86G. The resulting arrangement, as will be described hereinafter, facilitates the process of initially locating the beveled edge 66 in the groove 86D, as well as the process of initially locating the pattern edge 68 against the shoulder 86E.

The actuator 83 is adapted to move the object engager 84 into contact with and then along the object being traced (i.e., the lens mount 11, the lens 61A or the lens pattern 61B). In particular, the actuator 83 is adapted to provide such movement along the object 11, 61A, or 61B in such a way that the object engager 84 remains against the object 11, 61A, or 61B even when the object 11 includes high wrap. This provides a significant advantage over existing tracers which "fall out" of the lens mount 11 when they reach the high wrap region of the eyeglass frame 30.

Figure 11:
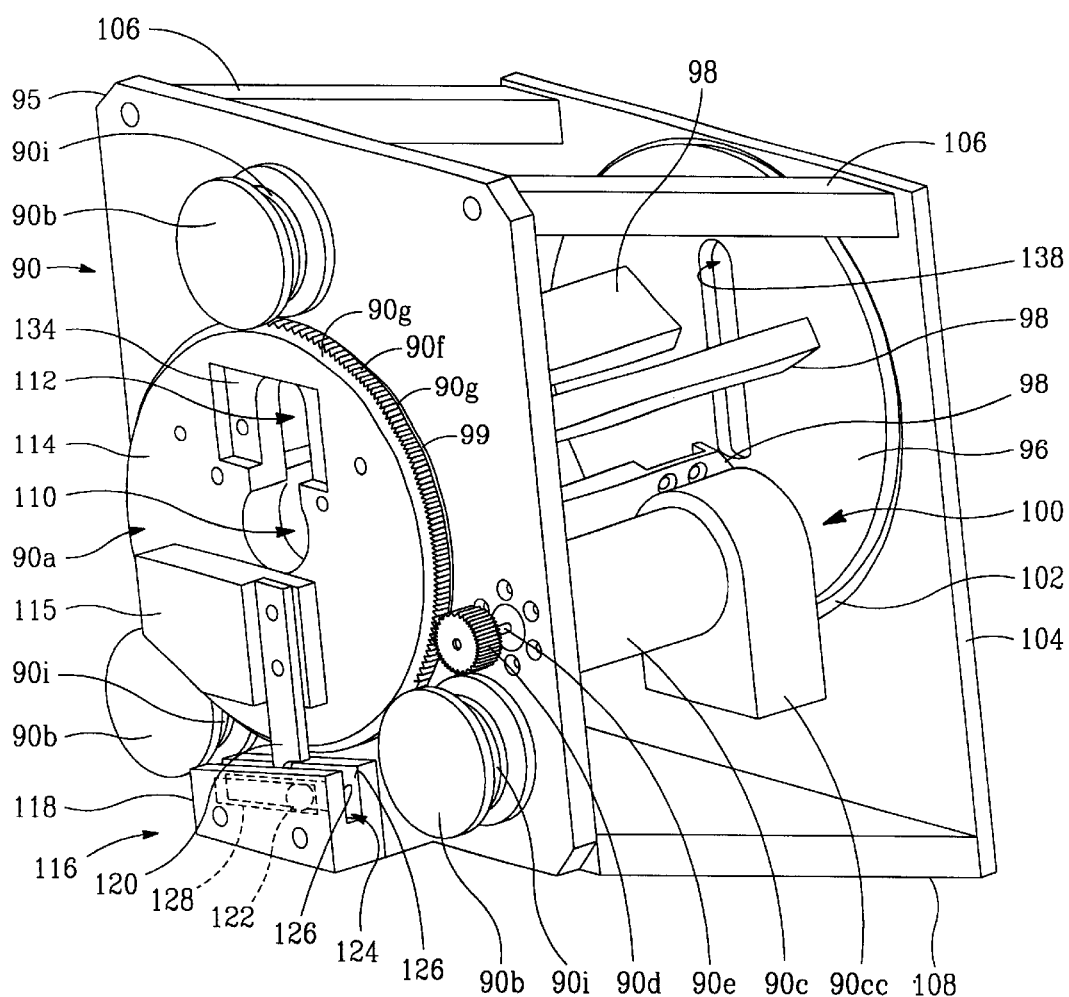
FIG. 11 is a rear perspective view of a rotator according to a preferred embodiment of the present invention.

The illustrated exemplary embodiment of the actuator 83 includes a rotator 90 adapted to rotate the object engager 84 along the lens mount 11 or along the beveled edge 66 of the lens 61A or the edge 68 of the lens pattern 61B. FIG. 11 illustrates the rotator 90 when the object engager 84 and some of its associated components have been removed.

As shown in FIG. 11, the rotator 90 includes a rotatable plate 90A, a set of rotatable guide rollers 90B, a rotation motor 90C, and a pinion gear 90D connected to the output shaft 90E of the rotation motor 90C. The rotation motor 90C preferably is reversible and has or is associated with an encoder 90CC or other device capable of electronically communicating the output shaft's rotational position to an external device. The encoder 90CC advantageously can be implemented using a rotary encoder, instead of a linear encoder. Rotary encoders can typically be less expensive than linear encoders. The preferred embodiment therefore achieves a significant reduction in manufacturing costs when compared to arrangements that require a linear encoder. Any suitable means for determining the rotational orientation of plate 90A may be utilized.

The pinion gear 90D rotates whenever the output shaft 90E rotates. The pinion gear 90D preferably meshes with a circumferential gear 90F on the rotatable plate 90A. The rotatable plate 90A therefore also rotates whenever the output shaft 90E of the motor 90C rotates. While the preferred embodiment provides direct coupling between the pinion gear 90D and the circumferential gear 90F, it is understood that the present invention is not limited to such arrangements. To the contrary, indirect couplings, belt couplings, and the like can be used when those arrangements become more desirable for one reason or another. The circumferential gear 90F likewise can be eliminated in favor of any other suitable means for coupling the rotation of the output shaft 90E to the rotatable plate 90A so that the rotatable plate 90A rotates whenever the output shaft 90E rotates.

Preferably, the diameter of the plate 90A varies along its thickness, and the circumferential gear 90F is located in a region of increased diameter. In the regions of less diameter than where the gear 90F is located, the plate 90A presents a smooth circumferential surface 90G. The smooth circumferential surface 90G makes contact with the guide rollers 90B. Preferably, the guide rollers 90B have a circumferential recess 90I that accommodates the gear 90F. The guide rollers 90B thereby straddle the gear 90F.

While the rotatable plate 90A is free to rotate, the plate 90A is prevented from shifting in a direction orthogonal to the rotation axis R by the positioning of the rollers 90B. In addition, the increase in diameter of the plate 90A extends into the circumferential recesses 90I of the rollers 90B to prevent the plate 90A from moving axially along the rotation axis R. Similar results can be achieved using alternative means, such as other roller configurations, different numbers and arrangements of rollers 90B, a shaft about which the plate 90A rotates, different bearing arrangements, and/or the like.

The guide rollers 90B are rotatably mounted to a back wall 95 of the actuator 83. A second rotatable plate 96 preferably is arranged parallel to the first rotatable plate 90A. The second rotatable plate 96 is connected to the first rotatable plate 90A by one or more braces 98. The braces 98 preferably extend parallel to the rotational axis R. The back wall 95 has an aperture 99 th at accommodates the braces 98 as they extend from the first rotatable plate 90A to the second rotatable plate 96. The combination of the first rotatable plate 90A, the second rotatable plate 96, and the braces 98 defines a rotator cage 100 which rotates in response to rotation of the motor's output shaft 90E.

The second rotatable plate 96 preferably is accommodated in an aperture 102 of a front wall 104 and is free to rotate in this aperture 102. The front wall 104 may be secured to the back wall 95 by any suitable means. In the illustrated embodiment, two beams 106 and a base plate 108 connect the front wall 104 to the back wall 95.

As best illustrated in FIG. 4, the front and back walls 104,95 may be tilted to angle T from vertical V. The front and back walls 104,95 thus are substantially orthogonal to the line of sight S, and preferably are parallel to the eyeglass frame 30 when the eyeglass frame 30 is held by the clamp assembly 28.

As best shown in FIG. 11, rotatable plate 90A has a central opening 110 and a radially extending slot 112. The combination of central opening 110 and radially extending slot 112 allows the object engager 84 to extend through the rotatable plate 90A, and thereby permits anchoring of the object engager 84 to the surface 114 of the plate 90A which faces away from the second rotatable plate 96.

The rotatable plate 90A further includes a counterweight 115. The counterweight 115 preferably is arranged so as to rotationally balance the rotator 90. Since balancing of the rotator 90 will depend to some extent on the position of the object engager 84 (i.e., how much the object engager 84 has been pivoted and how much it has been extended), the counterweight preferably is arranged to provide the desired rotational balance when the object engager 84 is located at an average or median tracing position. The rotator 90 therefore exhibits little tendency to rotate about the axis R toward a particular rotational orientation when the object engager 84 is located in that average or median tracing position.

Because the actuator 83 includes electrical devices that require power and some of which send and receive signals to and from stationary devices outside of the rotator 90, it is preferred that rotation of the rotator 90 be limited to keep the wiring between such components from becoming tangled, twisted, or damaged. The rotator 90 therefore includes a stop mechanism 116.

The stop mechanism 116 includes a stop bracket 118 which is secured to the back wall 95, and a stop arm 120 which is secured to the rotatable plate 90A. The stop arm 120 extends radially out from the rotatable plate 90A to engage a movable stop 122 in the stop bracket 118. The stop bracket 118 holds the movable stop 122 (which preferably comprises a ball, a roller, or the like) in a slot 124. The slot 124 provides two slot walls 126. Each of the slot walls 126 (or one of the slot walls 126) has a groove 128 that accommodates part of the movable stop 122. The movable stop 122 is free to move through the bracket 118 along groove(s) 128 but cannot move outside of the groove(s) 128. Preferably, the movable stop 122 is larger than the distance between the two slot walls 126. Movement of the stop 122 therefore terminates at the longitudinal ends of the groove(s) 128. Groove(s) 128 preferably extends about 5 to 15 degrees about the rotational axis R (preferably, about 10 degrees about the rotational axis R). When the 10-degree arrangement is utilized, rotation of the rotatable plate 90A is limited to a 370 degree range.

With reference to FIG. 11, rotation of the plate 90A in a counterclockwise direction urges the movable stop 122 toward the right. When the movable stop reaches the right end of the groove(s) 128, counterclockwise rotation of the plate 90A terminates. The rotatable plate 90A, however, remains free to rotate in the clockwise direction. Such rotation, however, is limited to 370 degrees. In particular, when the plate 90A is rotated in the clockwise direction, the stop arm 120 eventually returns to the bracket 118. As such rotation continues, the movable stop 122 is shifted to the left in the groove 128. When the movable stop 122 reaches the left end of the groove 128, clockwise rotation of the rotatable plate 90A terminates. The resulting shift of about 10 degrees in the position of the movable stop 122, thus, serves to limit rotation of the rotator 90 to a range of about 370 degrees.

The present invention, however, is not limited to the exemplary stop mechanism 116. To the contrary, there are numerous other ways to limit the rotation of the rotator 90. Included in these other ways are electrical control arrangements, motor controllers, and/or other mechanical stop mechanisms. Alternatively, the use of a stop mechanism can be eliminated by providing wireless communication between the electrical components that rotate along with the rotator 90, and those that are stationary, and/or by providing an arrangement of conductors and brushes which maintain electrical contact with each other between the rotator 90 and a stationary component, which electrical contact is maintained irrespective of the rotational orientation of the cage 100.

In addition to the rotator 90, the actuator 83 also includes a pivot mechanism 94, as best shown in FIG. 4, capable of pivoting the object engager 84 toward or away from the rotation axis R so that the object engager 84 initially engages the object being traced (i.e., the lens mount 11, the beveled edge 66, or the edge 68). Object engager 84 is disposed at an angle of about 7.5° relative to the axis of rotation R of cage 100 when in the rest position. After the initial engagement is achieved, tracing can begin. The pivot mechanism 94 therefore is adapted, according to the preferred embodiment, to facilitate movement of the object engager 84 toward or away from the rotation axis R as the object engager 84 is actuated along the object being traced (i.e., along the lens mount 11, along the beveled edge 66, or along the edge 68).

The pivot mechanism 94 preferably is mounted in a pocket 134 formed in the surface 114 of rotatable plate 90A. The pivot mechanism 94 therefore rotates along with the rotatable plate 90A. With reference to FIGS. 8 and 9, the pivot mechanism 94 preferably includes two pivot brackets 136 secured to the rotatable plate 90A. The pivot brackets 136, as illustrated in FIG. 8, are secured to the plate 90A on opposites sides of the radially extending slot 112. The pivot mechanism 94 therefore extends through the radially extending slot 112, through the cage 100, and toward a diametrically extending slot 138 in the front plate 104. Notably, the pivot axis P is offset from the rotational axis R. The amount of offset preferably is selected so as to maximize the compatibility of the tracer 10 with different sizes and shapes of frame mounts 11, lenses 61A, and lens patterns 61B. A preferred offset is between 25 and 30 millimeters, preferably about 27 millimeters.

Pivotally mounted between the pivot brackets 136 is a pivot arm 140. Preferably, bearings 139 in the pivot brackets 136 facilitate pivoting of the pivot arm 140 with respect to the pivot brackets 136. The object engager 84 is carried by the pivot arm 140 and extends through the diametrically extending slot 138. The object engager 84, by virtue of its being carried by the pivot arm 140, is free to pivot along with the pivot arm 140 toward and away from the rotational axis R.

In order to control and/or detect such pivoting, the pivot mechanism 94 further includes a pivot motor 142, an output shaft (not shown) of the pivot motor 142, a pinion gear (not shown) connected to the output shaft for rotation therewith, and a curved pivot rack 145 that preferably is connected to a distal end 146 of the pivot arm 140. The pivot motor 142 preferably is reversible and has or is associated with an encoder 142A or other device capable of communicating the output shaft's rotational position to an external device. The encoder 142A, much like the encoder 90CC, can be implemented using a rotary encoder, instead of a linear encoder. Additional savings in manufacturing costs therefore can be achieved. Any suitable means for determining the pivotal position of the pivot arm 140 can be provided.

The pinion gear rotates whenever the output shaft rotates. The pinion gear preferably meshes with gear teeth 148 on the pivot rack 145. The pivot rack 145 therefore causes pivoting of the pivot arm 140 whenever the output shaft of the pivot motor 142 rotates. In a similar manner, pivoting of the pivot arm 140 causes the output shaft of the pivot motor 142 to rotate in its place. Rotation of the output shaft therefore is indicative of pivoting of the pivot arm 140.

Preferably, the pivot rack 145 has a radius of curvature that substantially matches the radial distance $d_r$ between the pivot axis P (shown in FIG. 9) and the curved pivot rack 145. This way, there is no need to adjust the position of the pinion gear during pivoting, nor is there a need to pivotally connect the rack 145 to the pivot arm 140. The present invention, however, is not limited to arrangements having matched radii of curvature. The aforementioned alternatives to the preferred embodiment may suffice, as may other arrangements capable of pivoting the pivot arm 140 and/or capable of detecting the extent of such pivoting.

While the preferred embodiment provides direct coupling between the pinion gear and the curved pivot rack 145, it is understood that the present invention is not limited to such arrangements. To the contrary, indirect couplings, belt couplings, and the like can be used when those arrangements become more desirable for whatever reason. The curved pivot rack 145 likewise can be eliminated in favor of any other suitable means for coupling rotation of the output shaft of the pivot motor 142 to pivoting of the pivot arm 140.

Preferably, after the object engager 84 is initially engaged with the object to be traced, the pivot motor 142 applies a pivoting force to the pivot arm 140, urging the pivot arm 140 toward the object being traced (e.g., the frame mount 11, lens 61A, or lens pattern 61B). This pivoting force is maintained as the rotator 90 causes the pivot mechanism 94 to rotate. The object engager 84 therefore follows the contour of the object being traced. During this process, the rotational position of the motor's shaft is monitored (e.g., using encoder 142A). In particular, sequential samples of the rotational position of the shaft are taken. The collection of such samples is indicative of how much the pivot arm 140 has pivoted during each sample. Since the pivot arm 140 follows the contour of the object being traced, the collection of samples provides information concerning the contour of the object.

Often, however, the contour of the object (i.e., frame mounts 11, lenses 61A, and lens patterns 61B) will deviate from the radius of curvature defined by the predetermined distance $d_r$. It is desirable in those situations to compensate for such deviations. The object engager 84 of the preferred embodiment therefore is extendable and retractable with respect to the pivot mechanism 94. In particular, a linear bearing 150 (e.g., a linear ball slide) is disposed between the object engager 84 and the pivot arm 140. The linear bearing 150 allows the object engager 84 to slide in order to compensate for deviations in the radius of curvature by extending and retracting as needed, to keep the object engager 84 in contact with the object being traced. This is especially useful in connection with frames 30, lenses 61A, and/or lens patterns 61B that are not symmetrical and those that have a high wrap feature.

Preferably, an extension detector 164 is provided to detect how far the object engager 84 has been extended with respect to the pivot arm 140. The resulting extension information then is communicated using a suitable communication mechanism to a tracer controller and/or data acquisition system, as will be described hereinafter. In the preferred embodiment, the extension detector is provided in combination with an extension mechanism 160. The extension mechanism 160 is adapted to extend or retract the object engager 84 with respect to the pivot arm 140 of the pivot mechanism 94.

According to the preferred embodiment, the extension mechanism 160 includes a linear rack 162 at the proximal end 85 of the object engager 84, an extension motor 164, and a pinion gear 166 connected to an output shaft of the extension motor 164 for rotation therewith. The extension motor 164 preferably is reversible and has or is associated with an encoder 164A or other device capable of communicating the output shaft's rotational position to an external device. Alternatively, suitable means for determining the amount of extension of the object engager 84 can be provided. Because the encoder 164A can be implemented using a relatively inexpensive rotary encoder, as opposed to a linear encoder, manufacturing costs can be reduced according to the preferred embodiment.

The pinion gear 166 rotates whenever the output shaft of the motor 164 rotates. The pinion gear 166 preferably meshes with gear teeth 170 on the linear rack 162. The linear rack 162 therefore causes extension or retraction of the object engager 84 whenever the output shaft of the extension motor 164 rotates. In a similar manner, extension or retraction of the object engager 84 (e.g., as the object engager 84 traces the frame mount 11, lens 61A, or lens pattern 61B) causes the output shaft of the extension motor 164 to rotate. Rotation of the extension motor's output shaft therefore is indicative of the amount of extension or retraction. This rotation, in turn, can be monitored using the encoder 164A.

While the preferred embodiment provides direct coupling between the pinion gear 166 and the linear rack 162, it is understood that the present invention is not limited to such arrangements. To the contrary, indirect couplings, belt couplings, and the like can be used when those arrangements become more desirable for whatever reason. The linear rack 162 likewise can be eliminated in favor of any other suitable means for coupling rotation of the output shaft of the motor 164 to extension or retraction of the object engager 84.

By monitoring rotation of the extension motor's output shaft during the tracing operation, using the encoder 164A for example, it is possible to determine how far the object engager 84 was extended during several instances in the tracing process. The resulting samples then are combined with the samples obtained from the pivot motor's encoder 142 to derive information about the contour of the object being traced.

Because the pivot arm 140 pivots to keep the object engager 84 against the object being traced, and because the object engager 84 is extended and retracted as needed to keep the same part of the object engager 84 in contact with the object, the collection of samples, when correlated with the rotational position of the rotator 90 at the instant that each sample is taken, provides information concerning the configuration of that object, so that an accurate three-dimensional trace of the object can be recorded.

Notably, the preferred embodiment of the tracer 10 holds the object (e.g., frame 30, lens 61A, or pattern 61B) being traced in a vertical or near-vertical orientation. In FIG. 4, for example, the frame 30 is tilted only about ten degrees from vertical. Gravitational force, therefore, has little or no component in the axial direction with respect to the eyeholes or frame mounts 11 of the frame 30.

As a result, during the tracing operation, gravity provides little, if any, tendency for the object engager 84 to "fall out" of the lens mount 11 in a direction axial to the frame mount 11. Even when the stylus 86C engages the high wrap region of the lens mount 11, the force applied by gravity is not directed axially in such a way as to pull the stylus 86C out from the groove (not shown) in the lens mount 11.

Preferably, the curvature of the pivot rack 145, the dimensions of the pivot arm 140 and object engager 84, and the orientation of the object being traced are such that no "fall out" occurs when the face-form-curvature of the object ranges between 0 and about 10 diopters. Thus, lens mounts 11, lenses 61A, and lens patterns 61B with face-form-curvatures above, for example, 6 diopters can be reliably traced by the tracer 10 of the present invention, in addition to those with less face-form-curvature than 6 diopters.

Since each eyeglass frame 30 typically has two lens mounts 11, the tracer 10 preferably is adapted to shift the object engager 84 from alignment with a first of the lens mount 11 to alignment with the other lens mount 11 on the same eyeglass frame 30. This shifting can be accomplished by moving the clamp assembly 28 that holds the eyeglass frame 30 and/or by moving the object engager 84 itself.

In the preferred embodiment of the tracer 10, the clamp assembly 28 remains stationary while the object engager 84 is shifted. The tracer 10 is provided with a shift mechanism 180 adapted to shift the object engager 84 from alignment with one lens mount 11 to alignment with a second lens mount 11 of the eyeglass frame 30. After this shifting is performed, the actuator 83 moves the object engager 84 into contact with and then along the second lens mount 11 in substantially the same way as during tracing of the first lens mount 11.

Figure 12:
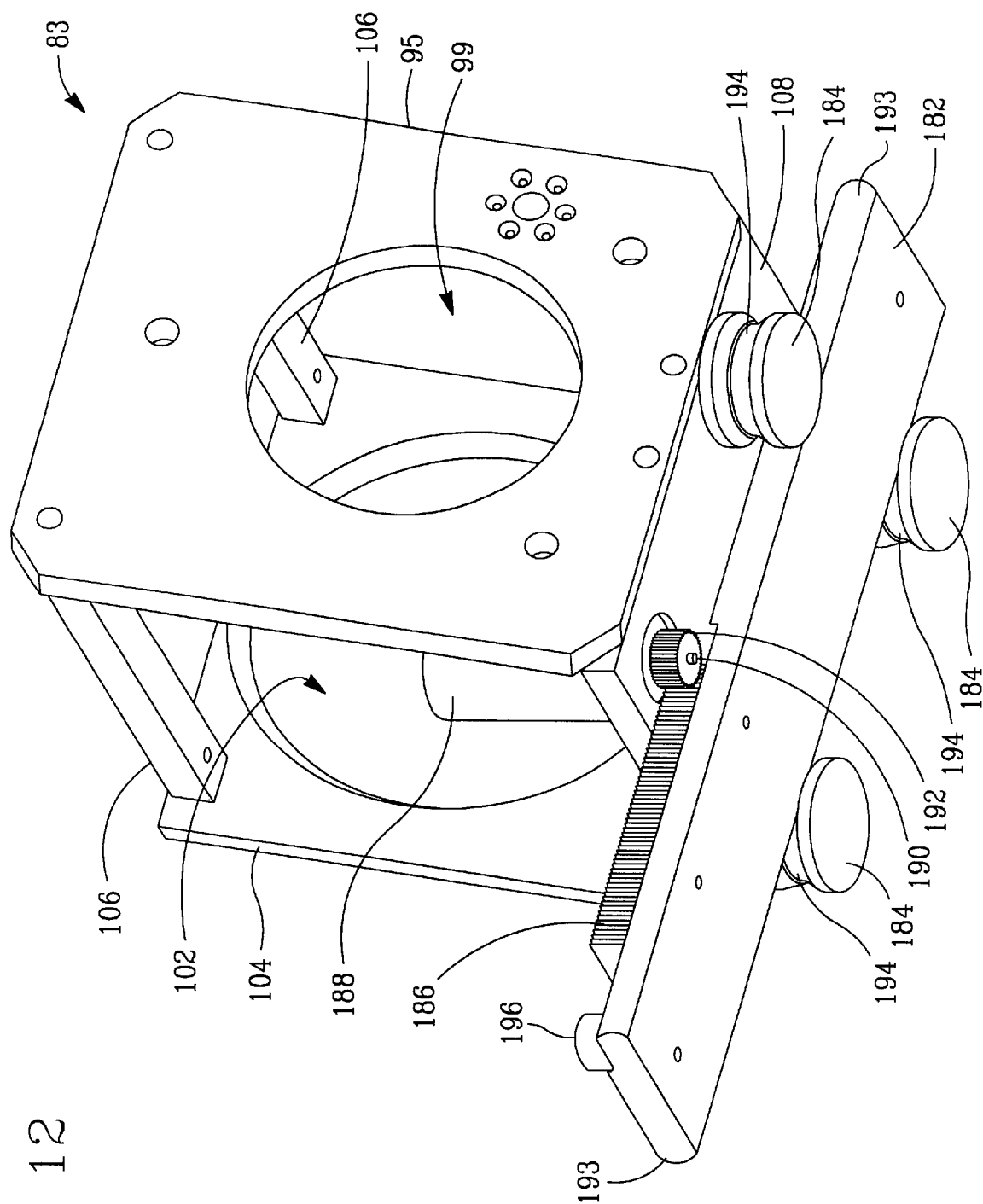
FIG. 12 is a rear perspective view of a shift mechanism according to a preferred embodiment of the present invention.

With reference to FIG. 12, the preferred shift mechanism 180 includes an actuator support plate 182, guide rollers 184 which are rotatably mounted to the base plate 108, a shift rack 186, a shift motor 188 having a rotatable output shaft 190, and a pinion gear 192 mounted for rotation on the output shaft 190. The actuator support plate 182, as illustrated in FIG. 2, is secured to the lateral walls 26. The actuator support plate 182 therefore remains stationary.

Notably, the actuator support plate 182 has outwardly bulging lateral edges 193. The outwardly bulging lateral edges 193 are received in correspondingly recessed circumferential surfaces 194 of the guide rollers 184. The bulging lateral edges 193, therefore, define a track upon which the guide rollers 184 ride. Since the guide rollers 184 are rotatably mounted to the base plate 108, the entire actuator 83 is movable along the length of the actuator support plate 182.

The pinion gear 192 is coupled to the shift rack 186. The shift rack 186 is fixed to the actuator support plate 182. Thus, rotation of the pinion gear 192 causes movement of the actuator 83 along the length of the actuator support plate 182.

Figure 14:
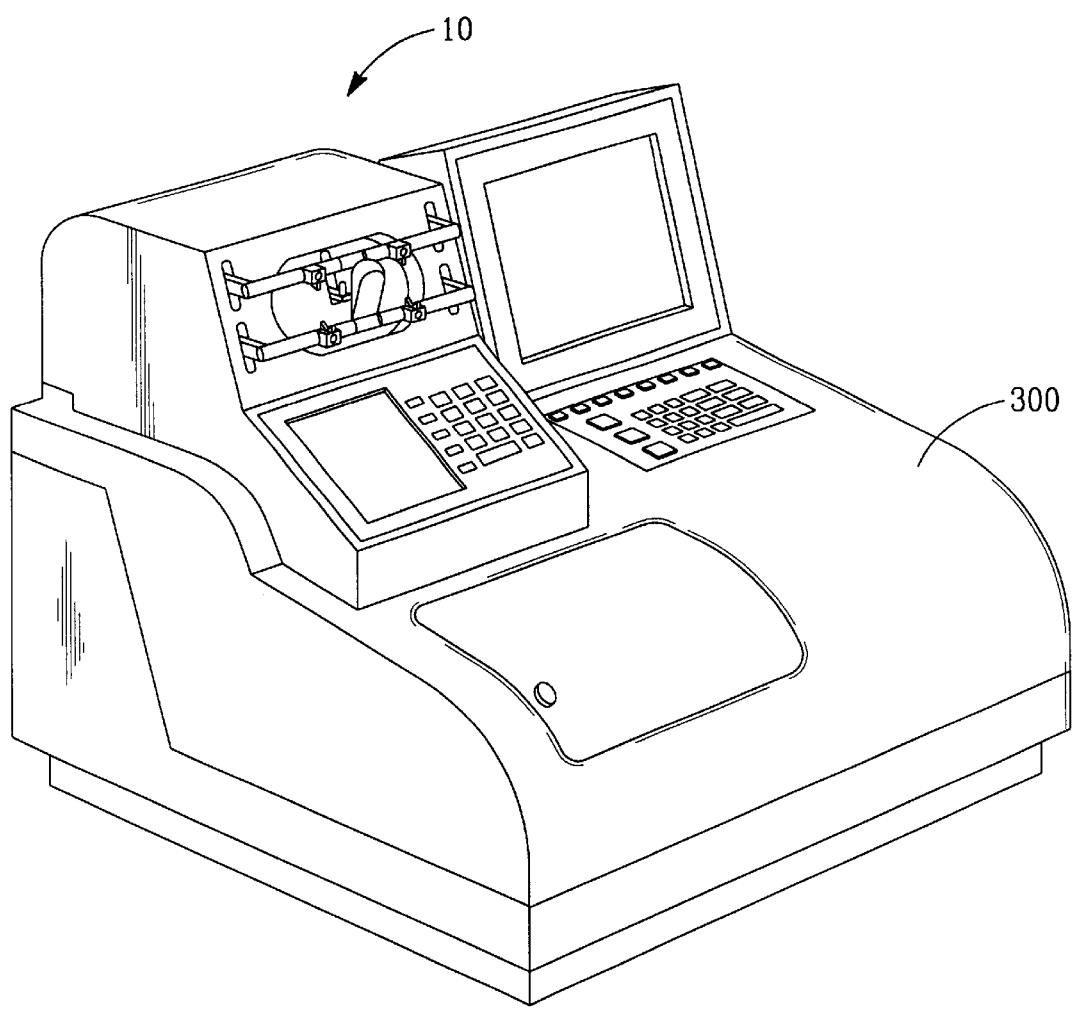
FIG. 14 is a perspective view of a combined tracer/edger apparatus according to a preferred embodiment of the present invention.

FIG. 12 illustrates the position of the shift mechanism 180 when the actuator 83 and the object engager 84 are aligned for tracing of the left lens mount 11 (shown in FIG. 1) of the eyeglass frame 30. After tracing of the left lens mount 11 is completed, the motor 188 can be activated to cause the pinion gear 192 to rotate. In particular, the pinion gear 192 in FIG. 14 is caused to rotate counter-clockwise. Since the actuator support plate 182 is held stationary by the lateral walls 26, the pinion gear's rotation causes the actuator 83 to shift to the left in FIG. 12. Such lateral shifting of the actuator 83 continues until the base plate 180 comes into contact with an end stop 196. The end stop 196 preferably is positioned along the length of the actuator support plate 182 so that the base plate 108 contacts the end stop 196 when the actuator 83 reaches a desired alignment for tracing of the right-side lens mount 11 of the eyeglass frame 30. Alternatively, sensors (not shown) can be used to determine when such shifting has achieved predetermined positions along the length of the actuator support plate 182.

The shift motor 188 preferably is reversible to facilitate shifting of the actuator 83 back toward the left-side lens mount tracing position shown in FIG. 12. Another end stop 198 is provided on the actuator support plate 182. In particular, the other end stop 198 is positioned along the length of the actuator support plate 182, so that the base plate 108 contacts the end stop 198 when the actuator 83 reaches the desired alignment (shown in FIG. 12) for tracing of the left-side lens mount 11 of the eyeglass frame 30. Preferably, the end stops 196,198 are positioned so as to permit lateral movement of the actuator 83 over a distance of about 64 millimeters, within a range of 60–70 millimeters.

With reference to FIG. 1, the top cover 12 covers the actuator 83 and most of the object engager 83 while the tracing operation is being performed. The top cover 12 includes elongated slots 200 through which the clamp arms 32A,32B extend. The clamp arms 32A,32B can pivot over a range defined by the length of the elongated slots 200. Preferably, this range is enough to permit tracing of frame mounts 11 and lenses 61A having a diameter of as much as 78 millimeters.

The top cover 12 includes an oval opening 202. The oval opening 202 exposes the second rotatable plate 96 through the top cover 12. As a result, the diametrically extending slot 138 is exposed, and the object engager 84 is able to extend through the housing 12. The longitudinal dimension of the oval opening 202 preferably is sufficient for the slot 138 to remain completely exposed regardless of the positioning of the actuator 83 by the shift mechanism 180. The combination of rotary, pivotal, and translational actuation of an object engager 84 of the tracer 10 advantageously provides a tracer assembly which can be made more compact than conventional linearly actuated tracers.

Figure 13:
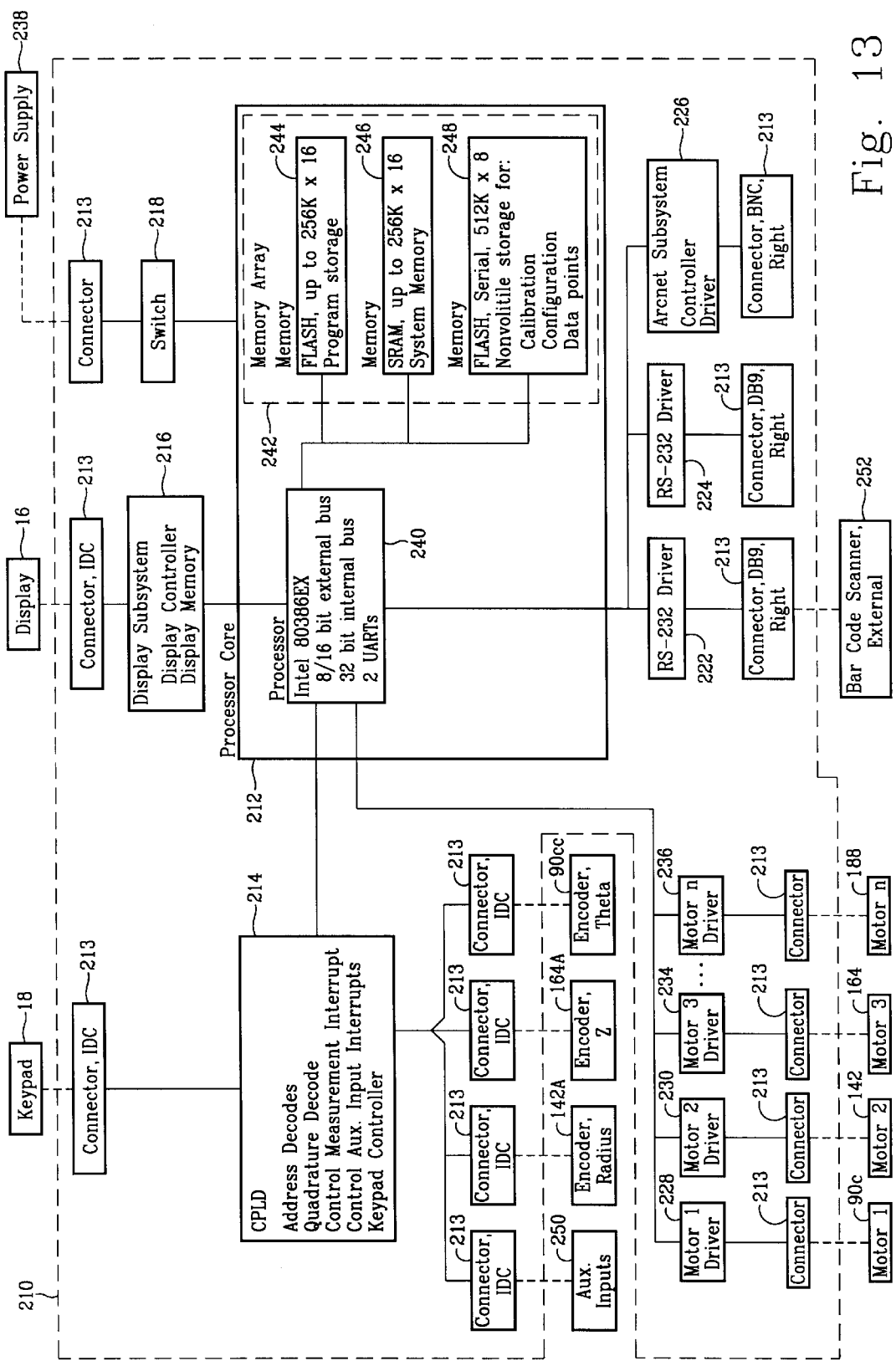
FIG. 13 is a schematic diagram of a control circuit according to a preferred embodiment of the present invention.

With reference to FIG. 13, the preferred embodiment of the tracer 10 is controlled by a control circuit 210. The control circuit 210 preferably includes a processor core 212, a programmable logic device 214 (e.g., a CPLD (complex programmable logic device)), a display subsystem 216, a power switch 218, a pair of "RS-232" drivers 222,224, an Arcnet subsystem 226, and four motor drivers 228, 230, 234, 236. The control circuit 210 preferably is configured on a printed circuit board (PCB). The PCB may be mounted, for example, to the inside of the housing 12, behind the keypad 18 and the display device 16. Connectors 213 can be provided on the printed circuit board wherever it is desirable to connect one of the circuit's components to an external device (i.e, a device not on the PCB).

The power switch 218 is connectable to an external power supply 238. When the switch 218 is closed, electrical power is supplied to the processor core 212. The processor core 212 preferably includes a processing unit 240 and a memory array 242. The processing unit 240 includes, for example, an Intel 80C386EX chip with an 8/16 bit external bus, a 32-bit internal bus, and two UARTs (universal asynchronous receiver/transmitters).

The memory array 242 preferably includes a program storage memory 244, a system memory 246 which can be used for program data storage, and a non-volatile memory 248 for storage of calibration information, configuration information, and data gathered during tracing operations. The program storage memory 244 preferably is implemented using a flash memory device capable of holding 256 kilobytes of 16-bit data. The system memory 246 preferably is implemented using a SRAM memory device capable of holding 256 kilobytes of 16-bit data. The non-volatile memory 248 preferably is implemented using a serial flash memory device capable of holding 512 kilobytes of 8-bit data.

The software used to control the tracer 10 preferably is provided using the "C" programming language, and wherever necessary, assembly language programming. A Borland Turbo C v3.1 compiler can be used to compile the source code. The preferred assembler is the TASM assembler associated with the aforementioned compiler. Paradigm Locate v6.0 preferably is used as the linker/locator. The preferred operating system is Custom Task Manager, and floating point math preferably is accomplished using Software Emulation, as provided by Borland Turbo C v3.1.

Preferably, the firmware system utilized by the control circuit 210 is task-based. That is, all of the tracer operations preferably are divided into different tasks. The tasks may operate on interrupts, a time slice or a combination of the two. The firmware system preferably is set up as a cooperative multitasking system. Each task has to run until it completes, it is interrupted, or it surrenders control. Primary task control is derived from a timer. The timer polls each time-sliced task to see if it is ready for execution. The following is a list of exemplary tasks:

Motor Control:
A. Shifting actuator 83 between left and right positions
B. Locating the object engager 84 at a starting point on the object being traced
C. Tracing the frame 30
D. Tracing a lens pattern 61B
E. Withdrawing the object engager 84 from the object being traced to a "home" position Measurement:
A. Detecting amount of pivoting
B. Detecting rotational orientation
C. Detecting translational position User Interface:
A. Keypad actuation
B. Display
C. Bar Code Communication:
A. Arcnet
B. RS-232
  a. OMA
  b. National Optronics Data Processing:
A. Shape flattening
B. Storing data
C. Retrieving data
D. Other Calculations Message handling, display updating, and data processing preferably are performed on a periodic basis. The keypad-related functions, communication-related functions, encoder-related functions, and motor control functions, by contrast, are performed on an asynchronous basis, according to the preferred embodiment.

The processing unit 240 is connected to the memory array 242, the display subsystem 216, the programmable logic device 214, the RS-232 drivers 222,224, the Arcnet subsystem 226, and the motor drivers 228, 230, 234, 236. The connection to the memory array 242 allows the processing unit 240 to store and retrieve data in and from the memory array 242. The connection to the Arcnet subsystem 226 facilitates communications (much like Ethernet communications) between the processing unit 240 and other devices linked to the Arcnet subsystem 226. The Arcnet subsystem preferably includes a controller and a driver.

The connection to the RS-232 drivers 222,224 enables the processing unit 240 to communicate with external devices, such as an external bar code scanner 252. The display device 16 preferably is controlled indirectly by the processing unit 240 via the display subsystem 216. The display subsystem 216 includes a display controller and memory, the combination of which is used to generate visual information on the display device 16.

The connection between the processing unit 240 and the programmable logic device 214 allows the processing unit 240 to receive suitably conditioned data signals and interrupts from the programmable logic device 214, which signals and interrupts are used by the processing unit 240 to appropriately carry out the desired tracing operation(s).

The programmable logic device 214 receives user inputs from the keypad 18 and is suitably programmed or otherwise configured to perform address decoding and quadrature decoding, to control measurement interrupts, and to control auxiliary input interrupts, based upon such user inputs and also based upon signals from the encoders 90CC, 142A, and 164A. The programmable logic device 214 therefore is connected to output signals from the keypad 18, from any auxilliary device 250, from the rotator motor's encoder 90CC, from the pivot motor's encoder 142A, and from the extension motor's encoder 164A.

In performing the address decoding function, the programmable logic device 214 preferably provides select lines for all peripheral devices. In performing quadrature decoding, the programmable logic device 214 converts encoder pulses from the encoders 90CC, 142A, and 164A into a count. The programmable logic device 214, in the process of performing the quadrature decoding, also provides a parallel interface and decodes the direction of rotation for each of the motor's 90C, 142, and 164 based on the signals from the encoders 90CC, 142A, and 164A. The rotational position of the cage 100, the pivoting position of the pivot arm 140, and the translational position of the object engager 84 therefore can always be known by the processing unit 240. Likewise, an appropriate PID servo control algorithm can be implemented to control the velocity and position of each motor 90C, 142, and 164.

In controlling the measurement interrupts, the programmable logic device 214 generates processor interrupts in response to gradient change (i.e., incremental changes in rotational orientation) and latches the current position values for rotation, pivoting, and translation (i.e., retraction or extension) based on the outputs from the encoders 90CC, 142A, and 164A. With regard to the auxilliary data inputs, the programmable logic device 214 generates processor interrupts on edge, allows for the masking of inputs, and creates a register of digital inputs.

The programmable logic device 214 preferably is programmed to scan input lines from the keys 18A–18C. When a key 18A–18C is pressed on the keypad 18, the programmable logic device 214 responds by generating an interrupt and latching data indicative of which key was pressed. An indication of which key was pressed is thereby provided to processing unit 240 of the processor core 212.

Since the positioning of a predetermined contact area (e.g., stylus 86C, groove 86D or shoulder 86E) of the object engager 84 can be expressed in terms of polar coordinates, the various positions and movements will be described hereinafter in terms of Theta, Radius, and Zeta (or Z), wherein Theta designates the rotational orientation of the cage 100, Radius designates how far the contact area has been pivoted, if any, away from the rotational axis R, and Zeta (or Z) designates how far the object engager 84 has been extended or retracted with respect to the pivot arm 140. The encoders 90CC, 142A, and 164A in FIG. 13 are denoted using the Theta, Radius, and Zeta designations.

The processing unit 240 preferably is suitably programmed or otherwise configured to perform a tracing operation on one or both of the lens mounts 11 of an eyeglass frame 30, to perform a tracing operation on the lens 61A, and/or to perform a tracing operation on the lens pattern 61B. The processing unit 240 performs such tracing operations by appropriately activating the motors 90C, 142, 162 (e.g., via drivers 228, 230 and 234, respectively), by receiving samples of positional information from the encoders 90CC, 142A, and 164A during such activation, and by converting the samples of positional information received from the encoders 90CC, 142A, and 164A into information sufficient to accurately represent the internal contour of the lens mount 11 and/or sufficient to accurately represent the external edge 66 or 68 of the lens 61A or lens pattern 61B. The resulting information then is stored by the processing unit 240 in the memory array 242. Thereafter, this information can be communicated to an external device via one of the RS-232 drivers 222,224 or the Arcnet subsystem 226 and/or can be displayed via the display device 16.

The tracer 10 thus provides a position acquisition system adapted to detect a translational position of the object engager 84 with respect to the pivot mechanism 94 and an angular position of the pivot mechanism 94, for each of a plurality of rotational orientations of the object engager 84. The memory array 242, in turn, provides an exemplary memory device which is connected, at least indirectly, to such a position acquisition system and which also is adapted to store the translational position and the angular position for each of the plurality of rotational orientations.

A preferred operation of the tracer 10 will now be described. Initially, the operator of the tracer 10 places the eyeglass frame 30 to be traced in the clamp assembly 28. The configuration of the clamp assembly 28 advantageously allows the operator to approach the tracer 10 with the frame 30 in hand, bows open and held in an orientation as if the operator were going the place the frame 30 on his/her own face. The frame 30 then is presented to the clamp assembly 28 by engaging the lower portion of the frame 30 into the eyeglass frame supports 46 on the bottom clamp arm 32B, while centering the nose portion 44 of the frame 30 on the frame centering device 42. Once in this position, the frame 30 is pushed down, thereby opening the clamp assembly 28 an amount necessary to tip the top portion of the frame 30 into the eyeglass frame supports 46 on the top clamp arm 32A. The pushing is sufficient to overcome the bias toward closure which preferably is built-in to the clamp assembly 28. Once the top portion of the frame 30 is aligned with the eyeglass frame supports 46 of the top clamp arm 32A, the operator stops pushing downward on the frame 30. This, in turn, causes the clamp assembly 28 to close in response to the aforementioned bias. The eyeglass frame 30 thereby is held securely in place.

Since the clamp arms 32A,32B always remain equidistant from the plane of symmetry 40, the final, closed position of the clamp assembly 28 places the vertical center of the frame mounts 11 at the plane of symmetry 40. Likewise, the position of the frame 30 in the horizontal direction is centered automatically with respect to the oval opening 202 by the frame centering device 42.

Before, during, or after clamping of the frame 30, information or queries regarding operation of the tracer 10 may be displayed to the operator using the display device 16 and/or the operator may enter information regarding the desired tracing operation via the keypad 18. The control circuit 210 responds to such information from the operator by either requesting additional information or by initiating the tracing operation.

The requests for additional information may include, for example, a requests for a Job Number, requests for information about the type of trace desired (frame, lens, or lens pattern), requests for information on which frame mount 11 or mounts 11 are to be traced (i.e., left mount, right mount, both mounts), requests for information about the type of frame being traced (e.g., metal, plastic, rimless, and the like), and/or requests for information about whether the stored file is to be protected.

While the preferred embodiment prompts the operator to enter such information via the keypad 18, some of the foregoing requests can be eliminated by adapting the tracer 10 to automatically detect the relevant information. The request for the type of trace, for example, can be obviated by configuring the tracer 10 to detect whether a holder 60 is present between the clamp arms 32A,32B instead of the frame 30.

The clamp arms 32A,32B, in this regard, may be electrically insulated from one another and the eyeglass frame supports 46 can be made from electrically insulating material. If the holder 60 then is made to exhibit a predictable electrical response to application of an electrical signal, the presence of the holder 60 in the clamp assembly 28 can be detected by applying such an electrical signal across the clamp arms 32A,32B and by making the tracer 10 responsive to the electrical response. Other ways of detecting the relevant information, of course, can be provided.

After entry of any requested information, the control circuit 210 automatically commences the tracing operation, or alternatively, commences the tracing operation only after the operator presses a START key on the keypad 18.

At commencement of the tracing operation, the shift mechanism 160 is automatically activated, if necessary, to shift the actuator 83 to the appropriate side of the actuator support plate 182. In particular, this is accomplished by sending an appropriate "shift" signal from the processing unit 240 to the motor driver 236 which, in turn, causes the motor 188 to execute the requisite amount of rotation in the requisite direction.

During the shifting operation, the object engager 84 preferably remains fully retracted. The rotational axis R preferably lies in the plane of symmetry 40 associated with the clamp assembly 28. The shifting operation preferably is performed so as to substantially align the center of the lens mount 11 to be traced with the rotational axis R.

Before, during, or after shifting has been accomplished, the rotator 90 is rotated so that the stylus 86C points toward either the twelve-o-clock position (i.e., the orientation shown in FIG. 4) or the six-o-clock position. The twelve-o'clock position will be used hereinafter as an example. The six-o'clock position can be implemented, however, by reversing some of the following steps or orientations.

With the regard to the twelve-o'clock orientation, the processing unit 240 accomplishes the requisite rotation of the actuator 83 by sending an appropriate signal to the motor driver 228 which, in turn, causes the motor 90C to execute the requisite amount of rotation. The rotation is confirmed by the output from the encoder 90CC.

The object engager 84 then is extended along the rotational axis R. This trajectory is preferred because it brings the object engager 84 into the frame mount 11 at the center thereof, and consequently reduces the likelihood that the stylus 86C will collide with the frame mount 11 during this initial movement. In order to achieve this initial movement, the processing unit 240 sends an appropriate signal to the motor driver 234 which, in turn, causes the motor 164 to execute the requisite amount of rotation in the requisite direction. The processing unit 240 also sends an appropriate signal to the motor driver 230 which, in turn, causes the motor 142 to execute a requisite amount of rotation in the requisite direction.

While such motor control commands can be sent simultaneously, a preferred arrangement provides rotation commands in an alternating manner, whereby incremental pivoting motions are interrupted by incremental extensions of the object engager 84. The combination of incremental pivoting and incremental translational movements is coordinated so that the stylus 86C moves along the rotational axis R until it reaches a predetermined position. This predetermined position can remain constant for all tracings and is defined as the position where the distance between the stylus 86C and the pivot axis P is substantially equal to the pivoting radius of the eyeglass frame support 46 on the top clamp arm 32A.

The processing unit 240 then sends an appropriate signal to the motor driver 230, directing the motor driver 230 to activate the motor 142. The motor driver 230 responds by causing the motor 142 rotate in a direction which causes the pivot arm 140 to pivot away from the rotational axis R toward the frame support 46 on the top clamp arm 32A. The object engager 84 thereby is pivoted toward the lens mount 11. Preferably, the torque applied by the motor 142 during such movement is enough to perform the requisite pivoting but is not enough to overcome the bias provided by the clamp assembly 28 toward closure. Thus, when the lens mount 11 is reached by the stylus 86C, the stylus 86C does not push the clamp assembly 28 open. Instead, the rotation of the motor 142 stops and a signal to that effect is provided to the processing unit 240, for example, by the encoder 142A associated with that motor 142.

The processing unit 240 then responds by commencing rotation of the cage 100. In particular, the processing unit 240 signals the motor driver 228 to commence rotation of the motor 90C in a first direction. The first direction of rotation will be such that the stop arm 120 moves away from the movable stop 122. During such rotation, the motor 142 continues to apply a pivoting bias away from the rotational axis R. This pivoting bias keeps the stylus 86C engaged against the frame mount 11 being traced.

As the rotation continues, variations in the shape of the lens mount 11 will cause the object engager 84 to extend and retract, and to pivot toward and away from the rotational axis R. During such pivoting and translational movements of the object engager 84, the Theta encoder 90CC is monitored. At predetermined intervals (preferably, at every gradient or 0.9 degrees of cage rotation), a "snapshot" is taken of the Theta, Radius, and Zeta positions based on signals from the Theta, Radius, and Zeta encoders 90CC, 142A, and 164A. Each "snapshot" results in a three-dimensional position vector. When the preferred interval of one gradient is used, there are 400 such vectors for each revolution of the cage 100.

Theta, Radius, and Zeta values for each interval are suitably captured by the programmable logic device 214 and are supplied to the processing unit 240 for storage in the memory array 242. When the Theta encoder 90CC indicates that an entire revolution has been completed, the control circuit 210 determines whether the tracing operation is complete or whether the other lens mount 11 of the eyeglass frame 30 is to be traced.

If the other lens mount 11 is to be traced, the control circuit 210 preferably directs the object engager 84 to return to the "home" position. The motor drivers 230 and 234 therefore cause the motors 142 and 164 to return the object engager 84 to the fully retracted position, preferably parallel to or aligned with the rotational axis R.

The control circuit 210 then activates the shift mechanism 180 to shift the actuator 83 to the opposite side of the actuator support plate 182. In the preferred embodiment, this is accomplished by sending an appropriate "shift" signal from the processing unit 240 to the motor driver 236 which, in turn, causes the motor 188 to execute the requisite amount of rotation in the requisite direction. Thereafter, the second frame mount 11 is traced in substantially the same way as the first frame mount 11, except that the rotation of the cage 100 is in the opposite direction. The cage 100 thus returns to its original orientation (the orientation before the first trace was performed) at the end of the second trace. This reversal of the direction of rotation keeps wires and the like which extend out from the cage 100 from becoming twisted, stressed, or otherwise damaged. By arranging the stop mechanism 116 to permit a 370 degree rotation of the cage 110, one can ensure that a full 360 rotation can be achieved, along with pre-measurement initiation or synchronization, in both rotational directions. After or during the second trace, the resulting data is stored in memory array 242.

The raw data stored in memory array 242 can be communicated externally, can be used to control a lens edger, and/or can be further processed by the processing unit 240. Several mathematical functions can be carried out on the raw data to convert it into a form which is more compatible with a lens edging apparatus. Examples of such functions include but are not limited to curve fitting, curve smoothing, asperity correction, three-dimensional-to-two-dimensional flattening, size adjustment, and the like. Once such processing of the raw data is performed, the converted data which results from such processing can be stored in an appropriate data file in the memory array 242 or can be communicated to a device which is external to the tracer 10.

Removal of the frame 30 from the clamp assembly 28 after the tracing operation has been completed can be achieved by simply pushing up or down on the frame 30 and tipping the frame 30 out from the frame supports 46 as the clamp arms 32A,32B separate. The operator of the tracer 10 then can reset the control circuit 210 by pressing a key 18A–18C on the keypad 18 which causes the display screen 16 to return to the initial display (e.g. the display which requests "job" information about the desired trace from the operator).

If the tracing operation is to be performed on a lens 61A or lens pattern 61B instead of the frame 30, the operator of the tracer 10 initially secures the lens 61A or lens mount 61B to the holder 60 in the manner indicated above with reference to FIGS. 5–7. The holder 60 then is placed in the clamp assembly 28. The configuration of the clamp assembly 28 advantageously allows the operator to approach the tracer 10 with the holder 60 in a comfortable position and using a comfortable arm/hand motion.

The holder 60 is presented to the clamp assembly 28 by engaging the lower leg 62 with the bottom clamp arm 32B. In doing so, the recess 74 in the lower leg 62 is already aligned with one of the frame supports 46 on the bottom clamp arm 32B. Preferably, in selecting which one of the two frame supports 46 on the bottom clamp arm 32B will be aligned with the recess 74, the user chooses the frame support 46 which is aligned with the rotational axis R of the actuator 83. This, in turn, avoids any shifting of the actuator 83 which otherwise is required when the user selects the other frame support 46.

Once bottom leg 62 is suitably engaged with the bottom clamp arm 32B so that the recess 74 receives the frame support 46, the holder 60 is pushed down, thereby opening the clamp assembly 28 an amount necessary to tip the top leg 62 into engagement with the top clamp arm 32A. This top leg 62 likewise engages the top clamp arm 32A so that the recess 74 receives the upper frame support 46. The pushing is sufficient to overcome the bias toward closure which preferably is built-in to the clamp assembly 28.

Once the both recesses 74 receive respective frame supports 46 while the legs 62 are held between the clamp arms 32A,32B, the operator stops pushing downward on the holder 60. This, in turn, causes the clamp assembly 28 to close in response to the aforementioned bias. The holder 60 thereby is held securely in place.

Since the clamp arms 32A,32B always remain equidistant from the plane of symmetry 40, the final, closed position of the clamp assembly 28 places the vertical center of the lens 61A or lens pattern 61B at the plane of symmetry 40. Likewise, the position of the holder 60 in the horizontal direction is centered automatically with respect to the rotational axis R by virtue of the recesses' alignment with the frame supports 46.

Before, during, or after clamping of the holder 60, information or queries regarding operation of the tracer 10 may be displayed to the operator using the display device 16 and/or the operator may enter information regarding the desired tracing operation via the keypad 18. The control circuit 210 responds to such information from the operator by either requesting additional information or by initiating the tracing operation.

The requests for additional information may include, for example, a requests for a Job Number, requests for information about the type of trace desired (frame, lens, or lens patterns), requests for information on which frame supports 46 have been placed in the recesses 74 of the holder 60, and the like. While the preferred embodiment prompts the operator to enter such information via the keypad 18, some of the foregoing requests can be eliminated, as indicated above, by adapting the tracer 10 to automatically detect the relevant information.

After entry of any requested information, the control circuit 210 automatically commences the tracing operation, or alternatively, commences the tracing operation only after the operator presses a START key on the keypad 18.

At commencement of the tracing operation, the shift mechanism 180 is automatically activated, if necessary, to shift the actuator 83 to the appropriate side of the actuator support plate 182. As indicated above, this is accomplished by sending an appropriate "shift" signal from the processing unit 240 to the motor driver 236 which, in turn, causes the motor 188 to execute the requisite amount of rotation in the requisite direction.

During the shifting operation, the object engager 84 preferably remains fully retracted. The shifting operation preferably serves to align the center of the lens 61A or lens pattern 61B with rotational axis R.

Before, during, or after the shifting operation, the rotator 90 causes rotation of the cage 100 so that the stylus 86C points toward the twelve-o'clock position. This rotation, of course, is not necessary if the stylus 86C is already in that position. An alternative implementation involves arranging the stylus 86C to point toward the six-o'clock position. In the following example, however, the implementation using the twelve-o'clock orientation will be described.

Initially, the object engager 84 is pivoted to a predetermined angle away from the rotational axis R and then is extended so that the transition portion 86F of the object engager 84 is located radially outside of the beveled edge 66 or edge 68. The predetermined angle is selected so that the object engager 84, when extended as far as the support 64 of the holder 60, is slightly closer to the rotational axis R than the radial distance separating the legs 62 of the holder 60 from the rotational axis R. Since the lens 61A, or lens pattern 61B is held between the legs 62 of the holder 60, this selection of the predetermined angle ensures that the transition portion 86F will be located radially outside of the beveled edge 66 or edge 68. The object engager 84 then is extended to an initial position which aligns the transition portion 86F radially outside of the edge 66 or 68. The amount of initial extension is known because the distance between the support 64 and the front surface 52 of the housing 12 is known and remains constant. The same amount of initial pivoting (Radius) and initial extension (Zeta) therefore can be used for all lenses 61A and lens patterns 61B.

Upon achieving this initial positioning of the object engager 84, the processor 240, via the motor driver 230, causes the motor 142 to pivot the object engager 84 toward the rotational axis R. Preferably, the torque applied by the motor 142 is enough to pivot the object engager 84 but is not enough to overcome the bias toward closure of the clamp assembly 28. Thus, when the transition portion 86F comes into contact with the beveled edge 66 or edge 68, rotation of the motor 142 stops without opening the clamp assembly 28. The motor's stoppage is communicated to the programmable logic device 214 and processor core 212 by the Radius encoder 142A. In response, the processing device 240 determines that the transition portion 86F of the object engager 84 has reached the beveled edge 66 or edge 68 of the lens 61A or lens pattern 61B, respectively.

The next step depends on whether the object being traced is a lens 61A or a lens pattern 61B. If a lens 61A is being traced, the motor 142 continues to apply a slight biasing torque which biases the object engager 84 toward the rotational axis K, and the motor 164 is activated to retract the object engager 84. As a result of such retraction, the groove 86D of the object engager 84 eventually reaches the beveled edge 66, and the beveled edge 66 become lodged therein. The effect of this engagement on rotation of the motor 164 is detected by the processing unit 240. The processing unit 240 determines based on this effect that the beveled edge 66 is properly engaged in the groove 86D.

If, by contrast, the object being traced is a lens pattern 61B instead of a lens 61A, the next step after engagement of the transition portion 86F to the edge 68 is to activate the motor 164 so as to extend (not retract) the object engager 84. This extension is accomplished while applying substantially the same bias toward the rotational axis R as is applied by the motor 142 in the case of a lens 61A. The object engager 84 therefore slides along the edge 68 of the lens pattern 61B until the shoulder 86E reaches the edge 68. When the shoulder 86E becomes lodged against the edge 68 of the lens pattern 61B, rotation of the motor 164 stops. The effect of the shoulder 86E on rotation of the motor 164 is detected by the processing unit 240 (e.g., via Zeta encoder 164A). The processing unit 240 then determines based on this effect that the edge 68 is properly engaged against the shoulder 86E. The processing unit 240 nevertheless keeps a slight amount of torque on the motor 164 toward extension. This slight torque helps keep the shoulder 86E lodged against the edge 68 of the lens pattern 61B.

Once the processing unit 240 determines that the shoulder 86E or groove 86D has been engaged by the edge 68 or beveled edge 66, respectively, the processing unit 240 responds by commencing rotation of the cage 100. In particular, the processing unit 240 signals the motor driver 228 to commence rotation of the motor 90C in the aforementioned first direction. During such rotation, the motor 142 continues to apply a pivoting bias toward the rotational axis R, and in the case of the lens pattern 61B, the motor 164 continues to apply the aforementioned biasing toward extension. These biases keep the object engager's groove 86D or shoulder 86E in contact with the beveled edge 66 or edge 68, respectively.

As the rotation continues, variations in the shape of the lens 61A or lens pattern 61B will cause the object engager 84 to extend and retract, and to pivot toward and away from the rotational axis R. During such pivoting and translational movements of the object engager 84, the Theta encoder 90CC is monitored much like the Theta encoder is monitored when a lens mount 11 is traced. At predetermined intervals (preferably, at every gradient or 0.9 degrees of cage rotation), a "snapshot" is taken of the Theta, Radius, and Zeta positions based on signals from the Theta, Radius, and Zeta encoders 90CC, 142A, and 164A. Each "snapshot" results in a three-dimensional position vector. When the preferred interval of one gradient is used, there are 400 such vectors for each revolution of the cage 100.

Theta, Radius, and Zeta values for each interval are suitably captured by the programmable logic device 214 and are supplied to the processing unit 240 for storage in the memory array 242. When the Theta encoder 90CC indicates that an entire revolution has been completed, the control circuit 210 determines that the tracing operation for the lens 61A or lens pattern 61B is complete.

Alternatively, if two lenses 61A or lens patterns 61B are to be traced, another holder 60 can be provided and mounted to the clamp assembly 28 at the frame supports 46 which are not being used by the first holder 60. The processing unit 240, in that case, would bring the object engager 84 back to the "home" position and would suitably activate the shift mechanism 180. The tracing process then would be performed as described above, except that it would be performed at the other end of the oval opening 202.

The raw data gathered as a result of the tracing the lens 61A or lens pattern 61B can be stored in memory array 242 and can be used in substantially the same way as the raw data which is provided after tracing a frame 30 or frame mount 11 thereof. In particular, it can be communicated externally, it can be used to control a lens edger, and/or it can be further processed by the processing unit 240. Mathematical functions can be carried out on the raw data, as indicated above, to convert it into a form which is more compatible with a lens edging apparatus. The foregoing examples of mathematical functions apply also to the lens and lens pattern tracings, as do the post-conversion activities described above.

Removal of the holder 60 from the clamp assembly 28 after the tracing operation has been completed can be achieved by simply pushing up or down on the holder 60 and tipping the holder 60 out from the clamp arms 32A,32B as they separate. The operator of the tracer 10 then can reset the control circuit 210 by pressing a key 18A–18C on the keypad 18 which causes the display screen 16 to return to the initial display (e.g. the display which requests "job" information about the desired trace from the operator).

The control circuit 210 of the tracer 10 preferably is suitably programmed or otherwise configured to facilitate calibration of the tracer 10. In order for a trace to reflect the proper size, at least some initial form of calibration should be provided. This is accomplished by tracing shapes of known size and then entering offset or adjustment values that are stored in the non-volatile memory 248. Whenever a trace is completed, these values are invoked so that the resulting data set accurately represents the item which was traced. Shapes of known size, whether frames, lenses or lens patterns, are created as hard tools and are mounted to the clamp assembly 28 in a similar manner to the objects which are to be traced. A known frame shape can be created, for example, as a hole in a plate with a beveled groove around the inside edge of the hole simulating the bevel groove on a frame. This shape may be a circle, ellipse, rectangle, or any other shape that can be traced and have its trace data compared to actual physical measurements of the hole. Lenses and patterns are traced in a similar manner by creating a "hard" lens or pattern of known shape and dimension and by mounting it to the same holder 60 that normal lenses and patterns are mounted to for tracing.

Once the calibration shape has been installed, the operator enters a calibration command via the keypad 18. The control circuit 210 responds by executing a calibration subroutine. In particular, the control circuit 210 causes the tracer to execute a tracing operation on the calibration shape. An estimated offset is entered via the keypad 18. Preferably, another trace is performed to check the result of the first test, and if further adjustment is needed, another entry is made. This iteration is performed until the size of the trace equals the dimension of the calibration shape, at which time the calibration is complete. The calibration shape then can be removed and the tracer 10 can be used to perform a subsequent trace on an object of unknown dimensions.

The processing unit 240 preferably is suitably programmed or otherwise adapted to compensate for the effects of gravity during rotation of the cage 100. The program stored in the memory array 242 which enables the processing unit 240 to perform the tracing operation, in this regard, preferably includes a gravity compensation subroutine. This, however, is only one example of the various gravity compensation systems which can be implemented in connection with the tracer 10.

The gravity compensation subroutine to some extent is associated with the pivot mechanism 94. It preferably counteracts the effects of gravity on the angular position (Radius) of the pivot mechanism 94 by directing the processing unit 240 to adjust, via motor driver 230, the torque applied by the motor 142 in keeping the object engager 84 properly engaged to the object being traced (e.g., lens mount 11, lens 61A, or lens pattern 61B). This adjustment of torque is performed in a manner dependent upon the rotational orientation of the object engager 84 (i.e., in a manner dependent upon the rotational orientation of the cage 100). The biasing of the object engager 84 toward the object being traced therefore varies based upon the rotational orientation of the object engager 84.

When the object engager 84 traces the lower part of the lens mount 11, for example, gravity alone provides enough biasing force that the torque of the motor 142 can be significantly reduced or even eliminated. By contrast, when the top of the lens mount 11 is being traced, gravity tends to pull the object engager 84 away from the lens mount 11. The torque applied by the motor 142 therefore is increased during tracing of the top of the lens mount 11.

The opposite is true during tracing of the lens 61A or lens pattern 61B. When the lens 61A or lens pattern 61B is traced, the tracing is performed around the external circumference, as opposed to the internal circumference. Gravity therefore tends to pull the object engager 84 away from the lens 61A or lens pattern 61B when the bottom, not the top, of the lens 61A or lens pattern 61B is being traced. Likewise, when the top of the lens 61A or lens pattern 61B is being traced, gravity urges the object engager 84 toward the object being traced.

The gravity compensation system or subroutine therefore is responsive not only to the rotational orientation of the cage 100 but also to information concerning the object being traced, especially whether the object is a frame mount 11 on the one hand, or a lens 61A or lens pattern 61B on the other hand.

Since gravity also has a varying effect on translation of the object engager 84 (i.e. retraction or extension) as the object engager 84 rotates with the cage 100, the gravity compensation subroutine preferably also provides compensation in the Zeta direction. This compensation depends upon the orientation of the cage 100. It need not depend, however, on the type of object being traced. The compensation in the Zeta direction provided by the processing unit 240 in response to the gravity compensation subroutine thus can be the same during tracing of a lens mount 11 as it is during tracing of a lens 61A or lens pattern 61B.

The gravity compensation subroutine to some extent is associated with the extension mechanism 180. It preferably counteracts the effects of gravity on the translational position (Zeta) of the extension mechanism 180 by directing the processing unit 240 to adjust, via motor driver 234, the torque applied by the motor 164. In particular, the torque is adjusted so as to counteract the weight of the object engager 83 in the Zeta direction. The weight, however, varies as a function of rotational orientation (Theta) and as a function of the pivotal position (Radius). The torque adjustment therefore is performed in a manner dependent upon the rotational orientation of the object engager 84 (i.e., in a manner dependent upon the rotational orientation of the cage 100) and/or in a manner dependent upon how far the object engager 84 has been pivoted from a horizontal orientation.

Since the pivoting angle (Radius) for most lens mounts 11, lenses 61A, and lens patterns 61B will not deviate significantly from an "average" pivoting angle (Radius), the gravity compensation subroutine which compensates for the effect of gravity along the Zeta direction can be simplified by causing the motor 164 to apply the compensation torque in a manner dependent only on the rotational orientation (Theta). The average pivoting angle upon which the simplified subroutine is based can be determined on a general basis (across all values of rotational orientation (Theta)), or alternatively, it can be determined for each rotational orientation (Theta) of the cage 100. It also can be determined individually for the category of objects being traced. An average pivoting angle, in this regard, can be determined for lens mounts 11, another can be determined for lenses 61A, and yet another can be determined for lens patterns 61B.

For each rotational orientation, therefore, the torque to be applied by the motor 164 using the simplified gravity compensation subroutine is determined based on what it would take to counteract the effects of gravity at that particular rotational orientation when the pivot angle (Radius) equals the average (or median) value of pivot angle (Radius).

Regardless of whether gravity compensation is provided, the tracer 10 advantageously provides three-dimensional servo control to the extent that each axis is position encoded and capable of closed loop position and/or force control via an appropriate servo algorithm implemented using either software or firmware.

The left/right shifting which enables the tracer 10 to measure both the left and right lens mounts 11 in an eyeglass frame 30, by contrast, is not position-encoded and therefore is not closed loop servo controlled. This, however, is not a limitation of the present invention, but rather a preferred embodiment which simplifies the construction of the left/right shifting mechanism 160.

Preferably, the processor core 212 is programmed to present interactive displays on the display device 16 before and during the tracing operation. The user of the tracer 10 is able to direct the tracer 10 to perform various tracing operations by selectively actuating keys 18A–18C on the keypad 18. The user then can review and appropriately respond to information and queries presented by the display device 16. Any subsequent responses also can be entered using the same or other keys 18A–18C.

The processing unit 240 preferably is suitably programmed or otherwise configured to implement software algorithms adapted to handle fault conditions. One example is an algorithm adapted to determine whether the object engager 84 has become disengaged from the object being traced. This algorithm, for example, can be implemented based on whether an erratic motion of the object engager 84 has been detected. If information from the encoders 90CC, 142A, or 164A, for example, indicates that the engagement has failed, an appropriate fault handling algorithm can be implemented in order to gracefully abort the tracing cycle and return the object engager 84 to the "home" position. The algorithm also can deliver an appropriate message or warning to the operator via the display device 16, and can include with the message information concerning what corrective action can be taken.

Once the tracing operation has been completed and the information has been converted and/or stored in memory array 242, the processor core 212 can communicate the resulting trace information to an external device, such as a remote data storage device, a remotely located or locally provided lens and/or pattern edging machine, a modem, and/or a communications network (e.g., a local area network (LAN), a telephone network, and the like). Preferably, the information is communicated via RS-232 driver 224.

An exemplary edging device 300 (the Optronics 6E Edger) which is being commercialized by the assignee hereof is illustrated in FIG. 14. Notably, the preferred embodiment of the tracer 10 can be nested on top of the exemplary edging device 300. By connecting the RS-232 driver 224 to an appropriate input of the edging device 300, an integrated edger/tracer apparatus can be provided, along with all the benefits of the tracer 10. The enhanced ability of the tracer 10 to trace frame mounts, lenses and patterns having high wrap characteristics, for example, provides an integrated edger/tracer which is advantageously capable of edging a lens so that the resulting lens will have the desired high wrap configuration.

What is claimed is:

1. A tracer for tracing a lens mount of an eyeglass frame, a lens or a lens pattern, said tracer comprising:

an object engager extending at an angle relative to the item to be traced and adapted to engage said lens mount, said lens, or said lens pattern;

a pivot mechanism; and an actuator adapted to move the object engager into contact with and then along the lens mount, the lens, or the lens pattern, wherein said object engager is angularly and pivotably mounted to said actuator by said pivot mechanism in such a way that said actuator moves said object engager along the lens mount, the lens, or the lens pattern, and against said lens mount, said lens, or said lens pattern independent of a pivot angle of said object engager, even when a shape of said lens mount, said lens, or said lens pattern includes high wrap.

2. The tracer of claim 1, further comprising a shift mechanism adapted to shift said object engager from alignment with said lens mount to alignment with a second lens mount of said eyeglass frame, said actuator being further adapted to move the object engager into contact with and then along the second lens mount in such a way that during movement along the second lens mount, the object engager remains against said second lens mount even when a shape thereof includes high wrap.

3. The tracer of claim 1, wherein said actuator includes:

a rotator adapted to rotate the object engager along the lens mount or along an edge of said lens or said lens pattern, wherein said pivot mechanism is adapted to pivot said object engager away from an axis of rotation of said rotator so that said object engager engages said lens mount or said edge of said lens or lens pattern, and is also adapted to facilitate movement of said object engager toward or away from said axis as said object engager is actuated along said lens mount or said edge of said lens or said lens pattern.

4. The tracer of claim 3, wherein said object engager is extendable and retractable with respect to said pivot mechanism.

5. The tracer of claim 3, wherein said actuator further includes an extension mechanism adapted to extend or retract said object engager with respect to said pivot mechanism.

6. The tracer of claim 3, further comprising a clamp adapted to hold said eyeglass frame.

7. The tracer of claim 6, wherein said clamp includes opposed clamp arms which are linked to one another so that movement of one of said clamp arms in a first direction causes a corresponding movement of the other of said clamp arms in an opposite direction, said movements of the clamp arms being substantially symmetrical with respect to said rotational axis.

8. The tracer of claim 7, wherein at least one of said clamp arms includes a frame centering device adapted to engage and retain a nose portion of said eyeglass frame when the eyeglass frame is suitably positioned in said clamp for tracing of each lens mount.

9. The tracer of claim 1, further comprising a clamp adapted to hold said eyeglass frame.

10. The tracer of claim 9, wherein said clamp includes opposed clamp arms which are linked to one another so that movement of one of said clamp arms in a first direction causes a corresponding movement of the other of said clamp arms in an opposite direction.

11. The tracer of claim 10, wherein at least one of said clamp arms includes a frame centering device adapted to engage and retain a nose portion of said eyeglass frame when the eyeglass frame is suitably positioned in said clamp for tracing of each lens mount.

12. The tracer of claim 1, wherein said object engager has a first surface oriented for contact with said lens mount and a second surface oriented for contact with said lens edge, said first surface having a stylus projecting therefrom, whereas said second surface has a groove adapted to receive a beveled lens edge.

13. The tracer of claim 12, wherein said second surface also is oriented for contact with a lens pattern edge and further includes a shoulder adapted to engage said lens pattern edge.

14. The tracer of claim 13, wherein said second surface further includes a transition portion located between said groove and said shoulder, said transition portion providing a bearing surface along which said lens pattern edge or said beveled lens edge may slide as said groove is brought into alignment with said beveled lens edge or as said shoulder is brought against said lens pattern edge.

15. The tracer of claim 14, wherein said transition portion is saddle-shaped, said second surface includes a bump, and said groove is located at a peak of said bump.

16. The tracer of claim 1, wherein:

said actuator includes a rotator adapted to rotate the object engager along the lens mount or along an edge of said lens or said lens pattern, wherein said pivot mechanism is adapted to pivot said object engager away from an axis of rotation of said rotator so that said object engager engages said lens mount or said edge of said lens or lens pattern said pivot mechanism is also adapted to bias said object engager toward said lens mount or said edge of said lens or said lens pattern, and said object engager is extendable and retractable with respect to said pivot mechanism so that said object engager follows the shape of said lens mount, of said lens or of said lens pattern during rotation of the object engager; and said tracer further comprises a position acquisition system adapted to detect a translational position of said object engager with respect to said pivot mechanism and an angular position of said pivot mechanism, for each of a plurality of rotational orientations of said object engager.

17. The tracer of claim 16, further comprising a memory device connected, at least indirectly, to said position acquisition system and adapted to store said translational position and said angular position for each of said plurality of rotational orientations.

18. The tracer of claim 16, further comprising a gravity compensation system associated with said pivot mechanism for counteracting the effects of gravity on said angular position, said gravity compensation system being adapted to provide said biasing of said object engager in a manner dependent upon the rotational orientation of said object engager.

19. The tracer of claim 1, wherein:
said actuator includes:
a rotator adapted to rotate the object engager along the lens mount or along an edge of said lens or said lens pattern; and
an extension mechanism adapted to extend or retract said object engager with respect to said pivot mechanism to achieve initial alignment of said object engager with said lens mount, with said edge of said lens, or with said edge of said lens pattern, said object engager being extendable and retractable with respect to said pivot mechanism so that said object engager follows the shape of said lens mount, of said lens or of said lens pattern during rotation of the object engager, wherein said pivot mechanism is adapted to pivot said object engager away from an axis of rotation of said rotator so that said object engager engages said lens mount or said edge of said lens or lens pattern and said pivot mechanism is also adapted to bias said object engager toward said lens mount or said edge of said lens or of said lens pattern; and
said tracer further comprises a position acquisition system adapted to detect a translational position of said object engager with respect to said pivot mechanism and an angular position of said pivot mechanism, for each of a plurality of rotational orientations of said object engager.

20. The tracer of claim 19, further comprising a memory device connected, at least indirectly, to said position acquisition system and adapted to store said translational position and said angular position for each of said plurality of rotational orientations.

21. The tracer of claim 19, further comprising a gravity compensation system associated with said pivot mechanism for counteracting the effects of gravity on said angular position, said gravity compensation system being adapted to provide said biasing of said object engager in a manner dependent upon the rotational orientation of said object engager.

22. The tracer of claim 21, wherein said gravity compensation system also is associated with said extension mechanism to counteract the effects of gravity on said translational position, said gravity compensation system being adapted to counteract the effects of gravity by also providing translational biasing of said object engager in a manner dependent upon the rotational orientation of said object engager.

23. The tracer of claim 1, further comprising:
a clamp adapted to hold said eyeglass frame, wherein said clamp includes opposed clamp arms which are linked to one another so that movement of one of said clamp arms in a first direction causes a corresponding movement of the other of said clamp arms in an opposite direction; and
a holder for said lens or said lens pattern, said holder having:
legs adapted to removably engage respective ones of said clamp arms when said lens or said lens pattern is to be traced instead of said lens mount; and
a support for said lens or for said lens pattern, said support being disposed between said legs and adapted to support said lens or said lens pattern between said legs without obstructing access by said object engager to a beveled edge of the lens or to an edge of the lens pattern.

24. The tracer of claim 23, wherein each of said clamp arms includes at least one eyeglass frame support with a notch for accommodating said eyeglass frame, each of said at least one eyeglass frame support being positioned so that placement of said eyeglass frame in said notch serves to align said lens mount for engagement by said object engager; and
wherein at least one of said legs has a recess which accommodates one of said at least one eyeglass frame support when said support for said lens or for said lens pattern is aligned with a substantial center of a range of motion of said object engager and said legs engage said respective ones of said clamp arms.

25. The tracer of claim 1, further comprising a clamp adapted to hold said eyeglass frame, wherein said clamp includes opposed clamp arms which are linked to one another so that movement of one of said clamp arms in a first direction causes a corresponding movement of the other of said clamp arms in an opposite direction;
wherein each of said clamp arms includes at least one eyeglass frame support with a notch for accommodating said eyeglass frame, each of said at least one eyeglass frame support being positioned so that placement of said eyeglass frame in said notch serves to align said lens mount for engagement by said object engager.

26. The tracer of claim 1, further comprising a clamp adapted to hold said eyeglass frame at a predetermined angle between 0 degrees and 45 degrees from a vertical orientation.

27. The tracer of claim 1, wherein said clamp includes opposed clamp arms which are linked to one another so that movement of one of said clamp arms in a first direction causes a corresponding movement of the other of said clamp arms in an opposite direction, said clamp being adapted to hold said eyeglass frame at a predetermined angle between 0 degrees and 45 degrees from a vertical orientation regardless of how far apart said clamp arms are when they engage said eyeglass frame.

28. A clamp for holding eyeglass frames, said clamp comprising opposed clamp arms which are linked to one another so that pivotal movement of one of said clamp arms in a first direction causes a corresponding pivotal movement of the other of said clamp arms in an opposite direction.

29. The clamp of claim 28, further comprising at least one lateral wall, each clamp arm being pivotally connected to said at least one lateral wall, each clamp arm having a gear connected thereto which rotates whenever said clamp arm pivots with respect to said at least one lateral wall, said gears being intermeshed so that pivoting of one of said clamp arms in a first direction causes the other of said clamp arms to pivot in an opposite direction, whereby said clamp arms remain substantially equidistant from a plane of symmetry located between the clamp arms.

30. The clamp of claim 29, wherein said clamp arms are pivotally biased toward one another.

31. The clamp of claim 30, wherein at least one of said clamp arms includes a frame centering device adapted to engage and retain a nose portion of an eyeglass frame when the eyeglass frame is suitably positioned in said clamp.

32. The clamp of claim 31, wherein said frame centering device is spring-loaded to urge said frame centering device into said nose portion.

33. The clamp of claim 28, further comprising a holder for a lens or for a lens pattern, said holder having:

legs adapted to removably engage respective ones of said clamp arms; and a support for said lens or for said lens pattern, said support being disposed between said legs and adapted to support said lens or said lens pattern between said legs without obstructing access to a beveled edge of the lens or to an edge of the lens pattern.

34. The clamp of claim 33, wherein each of said clamp arms includes at least one eyeglass frame support with a notch for accommodating an eyeglass frame; and wherein at least one of said legs has a recess which accommodates one of said at least one eyeglass frame support when said support for said lens or for said lens pattern is located in a desired position.

35. The clamp of claim 28, wherein each of said clamp arms includes at least one eyeglass frame support with a notch for accommodating said eyeglass frame.

36. The clamp of claim 28, wherein said clamp arms are configured to hold said eyeglass frame at a predetermined angle between 0 degrees and 45 degrees from a vertical orientation.

37. The clamp of claim 28, wherein said clamp arms are adapted to hold an eyeglass frame at a predetermined angle between 0 degrees and 45 degrees from a vertical orientation regardless of how far apart said clamp arms are when they engage said eyeglass frame.

38. An object engager for a tracer, said object engager comprising:

a first surface oriented for contact with a lens mount of an eyeglass frame, and a second surface oriented for contact with a beveled lens edge or lens pattern edge and for contact with a lens pattern edge, whereas said second surface includes:

a groove adapted to receive said beveled lens edge having a stylus projecting from said second surface;

a shoulder adapted to engage said lens pattern edge, and a transition point located between said groove and said shoulder, said transition point providing a bearing surface along which said lens pattern edge or said beveled lens edge may slide as said groove is brought into alignment with said beveled lens edge or as said shoulder is brought against said lens pattern edge.

39. The object engager of claim 38, wherein said transition portion is saddle-shaped, said second surface includes a bump, and said groove is located at a peak of said bump.

40. A method of tracing an eye mount of an eyeglass frame, comprising the steps of:

securing the eyeglass frames in a substantially vertical orientation;

curvalinearly extending an object engager toward the eyeglass frames and thereby causing an end portion of the object engager to be seated within the bevel groove of a first mount of the eyeglass frames;

moving the object engager with an actuator about the bevel groove and collecting information about the configuration of the bevel groove, the object engager being angularly and pivotably mounted to the actuator; and determining the configuration of the bevel groove from the collected information, wherein the object engager movement is independent of a pivot angle of the object engager.

41. The method of claim 40, including the step of:

maintaining the object engager at an angle relative to the axis of rotation.

42. The method of claim 41, including the step of shifting the eyeglass frames laterally after the information about the configuration of the bevel groove has been collected and thereby exposing a second mount of the eyeglass frames.

43. A lens tracer, comprising:

first and second cooperating clamps adapted for holding an eyeglass frame therebetween, said clamps extending generally horizontally in order to vertically orient the eyeglass frame;

an extensible object engager having a stylus for being seated within the bevel groove extending about a lens mount of a lens opening in the eyeglass frame;

a rotatable cage, said object engager rotatable with said cage for thereby causing said stylus to trace about the bevel groove, said object engager being angularly disposed relative to the axis of rotation of said cage; and a plurality of encoders operably associated with said stylus and said cage for collecting information indicative of the configuration of the bevel groove, wherein a shifter assembly is operably associated with said clamps for linearly shifting the eyeglass frame in order to expose another lens mount after the information indicative of the configuration of said first mentioned bevel groove has been collected.

* * * * *